(12) United States Patent
Horvitz et al.

(10) Patent No.: US 8,244,559 B2
(45) Date of Patent: Aug. 14, 2012

(54) CLOUD COMPUTING RESOURCE BROKER

(75) Inventors: Eric J. Horvitz, Kirkland, WA (US);
Harold L. Cochrane, Redmond, WA (US); Rene A. Vega, Kirkland, WA (US); Angel S. Calvo, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 453 days.

(21) Appl. No.: 12/492,813

(22) Filed: Jun. 26, 2009

(65) Prior Publication Data

US 2010/0332262 A1 Dec. 30, 2010

(51) Int. Cl.
*G06Q 40/00* (2006.01)
(52) U.S. Cl. .............................................. 705/4; 705/30
(58) Field of Classification Search ............... 705/4–44
See application file for complete search history.

(56) References Cited

U.S. PATENT DOCUMENTS

| | | | | |
|---|---|---|---|---|
| 6,088,688 | A * | 7/2000 | Crooks et al. ................. | 705/412 |
| 6,249,836 | B1 * | 6/2001 | Downs et al. ................. | 710/268 |
| 7,290,009 | B1 * | 10/2007 | Semret et al. ......................... | 1/1 |
| 7,574,496 | B2 * | 8/2009 | McCrory et al. .............. | 709/223 |
| 7,720,972 | B2 * | 5/2010 | Grimm et al. ................. | 709/226 |
| 7,743,001 | B1 * | 6/2010 | Vermeulen et al. ........... | 705/400 |
| 7,941,427 | B2 * | 5/2011 | Barsness et al. .............. | 707/720 |
| 2007/0186212 | A1 | 8/2007 | Mazzaferri et al. | |
| 2008/0080396 | A1 | 4/2008 | Meijer et al. | |
| 2008/0082546 | A1 | 4/2008 | Meijer et al. | |
| 2008/0300948 | A1 | 12/2008 | Boss et al. | |

OTHER PUBLICATIONS

Altmann, "A Model for Resource Sharing for Internet Data Center Providers within the Grid", retrieved on Jul. 22, 2009 at http://it.i-u.de/schools/altmann/publications/gecon_2004_v06_altmann.pdf, 1st IEEE Intl Workshop on Grid Economics and Business Models, Apr. 2004, 7 pages.

Buyya, et al., "Market-Oriented Cloud Computing: Vision, Hype, and Reality for Delivering IT Services as Computing Utilities", retrieved on Jul. 22, 2009 at http://arxiv.org/ftp/arxiv/papers/0808/0808.3558.pdf, 10th IEEE Intl Conf on High Performance Computing and Communications, Sep. 2008, 9 pgs.

Buyya, et al., "Service and Utility Oriented Distributed Computing Systems: Challenges and Opportunities for Modeling and Simulation Communities", retrieved on Jul. 22, 2009 at http://ieeexplore.ieee.org/stamp/stamp.jsp? arnumber=04494407, 41st Annual Simulation Symposium, IEEE, Apr. 2008, pp. 68-81.

"Cloud Consumers Need Brokerages to Unlock the Potential of Cloud Services", retrieved on Jul. 23, 2009 at http://www.datamanager.it/cms/view/sezioni_web/english_contents/cloud_consumers_need_brokerages_to_unlock_the_potential_of_cloud_services_/s162/c81114, Sep. 7, 2009, pp. 1-4.

"Global Resource Manager Overview", retrieved on Jul. 23, 2009 at http://publib.boulder.ibm.com/infocenter/tivihelp/v14r1/index.jsp?topic=/com.ibm.tivoli.tpm.rb.doc/resbroker/crbk_genresmgr.html, Tivoli Intelligent Orchestrator, Version 5.1, 2 pages.

Neumann, et al., "Exchanges for Grid and Cloud Computing", retrieved on Jul. 22, 2009 at http://www.gridecon.eu/downloads/Sorma.pdf, eStrategies, Britisch Publishers, Nov. 2008, pp. 25-26.

* cited by examiner

*Primary Examiner* — Frantzy Poinvil
(74) *Attorney, Agent, or Firm* — Lee & Hayes, PLLC

(57) ABSTRACT

Embodiments for interacting with cloud computing providers are disclosed. In accordance with at least one embodiment, a resource broker receives a request for a computing task that is to be performed from a customer. The resource broker selects one of the cloud computing providers to perform at least a part of the computing task. In turn, the resource broker may obtain a gain from performance of the at least one part of the computing task by the cloud computing provider.

17 Claims, 19 Drawing Sheets

CLOUD COMPUTING RESOURCE BROKER

BACKGROUND

"Cloud computing" refers to the access of computing resources and data via a network infrastructure, such as the Internet. The computing resources and data storage may be provided by linked data centers of the "cloud," i.e., network. Each of the data centers may include a plurality of servers that provide computing resources, as well as data storage and retrieval capabilities. Users of cloud computing generally do not need knowledge regarding or control over the underlying data center infrastructure of the "cloud". Rather, the users may access the computing resources and data storage capabilities on an as-needed basis.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Described herein are embodiments of various techniques for using cloud computing resource brokers to facilitate the acquisition and use of cloud computing services from cloud computing providers by customers. As used herein, "cloud computing resource brokers" may also be referred to as "resource brokers." The resource brokers may assist customers in obtaining the most cost-effective and simplified use of cloud computing services so that the benefit of cloud computing may be maximized for the customers.

In at least one embodiment, a resource broker receives a request for a computing task that is to be performed from a customer. The resource broker selects one of the cloud computing providers to perform at least a part of the computing task. In turn, the resource broker may obtain a gain from performance of the at least one part of the computing task by the cloud computing provider. Other embodiments will become more apparent from the following detailed description when taken in conjunction with the accompanying drawings.

BRIEF DESCRIPTION OF THE DRAWINGS

The detailed description is described with reference to the accompanying figures. In the figures, the left-most digit(s) of a reference number identifies the figure in which the reference number first appears. The use of the same reference number in different figures indicates similar or identical items.

DETAILED DESCRIPTION

This disclosure is directed to services provided by cloud computing resource brokers to ensure that computing tasks received from customers, i.e., users, are performed in a time and cost efficient manner by cloud computing providers.

"Cloud computing" refers to the access of computing resources and data via a network infrastructure, such as the Internet. The computing resources and data storage may be provided by linked data centers of the "cloud," i.e., network. Each of the data centers may include a plurality of servers that provide computing resources, as well as data storage and retrieval capabilities. Further, "cloud computing providers" refer to the owners or operators of the data centers that makeup the "cloud."

As cloud computing data centers proliferate due to increased reliance by customers, and with the commoditization of cloud computing service capabilities, customers desiring to use cloud computing services have an ever expanding array of choices in cloud computing providers and associated data centers. Thus, cloud computing resource brokers, alternatively referred to herein as "resource brokers," may assist customers in selecting, negotiating with, and contracting with cloud computing providers to obtain cost effective and reliable cloud computing services. Moreover, the resource brokers may also take into consideration additional concerns of the customers (e.g., environmental impact) when choosing a cloud computing provider. In some instances, the resource brokers may provide assurance, in the form of insurance, that customers are compensated when the cloud computing providers fail to meet the expectation of the customers. In addition, customers may further rely on a resource agent to select an appropriate resource broker that will, in turn, choose a suitable cloud computing providers.

In some embodiments, the resource brokers may provide a computing task received from a customer to one or more cloud computing providers to ensure that the task will be efficiently performed in an economical manner. In other embodiments, the resource brokers may abstract a computing task received from a customer into smaller computing tasks so that the smaller computing tasks may be performed by various cloud computing providers. In further embodiments, the resource broker may provide insurance that a computing task received from the customer is processed according to predetermined metrics by the cloud computing providers. In yet other embodiments, the resource brokers may provide additional services as they act as liaisons between customers and cloud computing providers. Various embodiments of services provided by the cloud computing resource brokers are described below with reference to FIGS. 1-16.

Exemplary Environment

Figure 1:
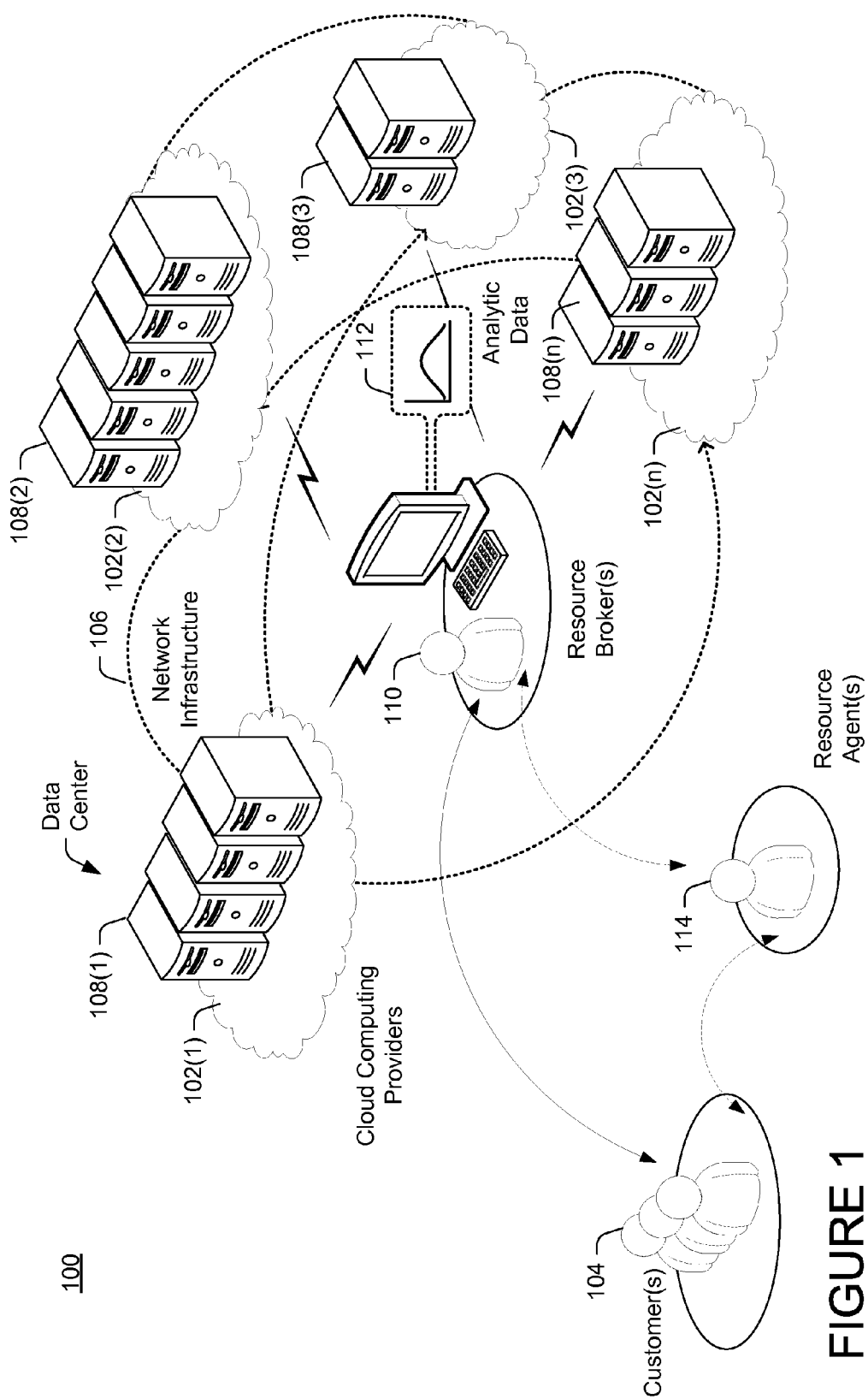
FIG. 1 is a simplified block diagram that illustrates an exemplary environment for cloud computing resource brokers to interface between customers and cloud computing providers, in accordance with various embodiments.

FIG. 1 is a simplified block diagram that illustrates an exemplary environment 100 for cloud computing resource brokers to interface between customers and cloud computing providers, in accordance with various embodiments. In various embodiments, each of the cloud computing providers 102(1)-102(n) may be equipped with data centers that provide computing resources and data storage/retrieval capabilities to customers over a network infrastructure 106, such as the Internet. As used herein, computing resources may refer to any hardware and/or software that are used to process input data to generate output data, such as by the execution of algorithms, programs, and/or applications. Each of the respective data centers may be further connected to other data centers via the network infrastructure 106. The ability of the respective data centers to process and/or store and retrieve data may be referred to herein as service capability.

In some embodiments, each of the data centers may include networked servers that provide the computing resource and data storage capabilities. As shown in FIG. 1, the data center 102(1) may include one or more servers 108(1), the data center 102(2) may include one or more servers 108(2), the data center 102(3) may include one or more servers 108(3), and the data center 102(n) may include one or more servers 108(n).

In other embodiments, each of the data centers may make use of any non-enterprise computing device that is equipped with processing, storage, and networking capabilities (e.g., personal computers, portable computers, game consoles, portable phones, etc.) In still other embodiments, the data centers may include a combination of one or more servers and one or more non-enterprise computing devices.

Customers 104 may include various entities that desire to use cloud computing resources. For example, but not as a limitation, the customers 104 may include businesses, charitable organizations, private individuals, government organizations, and educational institutions. The customers 104 may desire to use the service capabilities of the data centers maintained by the cloud computing providers on on-demand basis, without the desire to control the provider or understand the origin of the computing resources.

The resource broker 110 may be an entity that facilitates interactions between one or more of the cloud computing resource providers 102(1)-102(n) and the customers 104. Thus, the customers 104 may obtain the use of computing resources without dealing directly with the cloud computing providers 102(1)-102(n). For example, but not as a limitation, the resource broker 110 may locate and obtain the most cost-effective service capability from one or more of cloud computing providers 102(1)-102(n). In various embodiments, as further described below, the resource broker 110 may negotiate for computing resources from one or more of the cloud computing providers 102(1)-102(n), provide computing tasks to selected ones of the cloud computing providers 102(1)-102(n) on behalf of the customers 106, provide results for the customers 104, collect payments from the customers, and provide compensation to the utilized ones of cloud computing providers 102(1)-102(n). In at least some embodiments, the resource broker 110 may perform these actions via the use of data 112 (e.g., prior performance and cost history) on one or more of the cloud computing providers 102(1)-102(n). The resource broker 110 may also derive gain from the difference between the payments received from the customers 104 and the compensation paid to the cloud computing providers as reward for the services provided. It will be appreciated that while only a single resource broker 110 is illustrated in FIG. 1, a plurality of resource broker 110 may interact with the cloud computing providers 102(1)-102(n) and customers 104.

In additional embodiments, one or more resource agents 114 may also interact with the one or more resource brokers 110 to select the appropriate resource broker 110 that will, in turn, choose the suitable cloud computing provider for a customer 104.

Exemplary Processes

FIGS. 2-15 describe various exemplary processes in accordance with embodiments of cloud computing resource brokering, such as those described above with reference to FIG. 1. The order in which the operations are described in each exemplary process is not intended to be construed as being definitive, and any number of the described operations can be combined in any order and/or in parallel to implement each process. Moreover, the operations in the FIGS. 2-15 may be implemented in hardware, software, and a combination thereof. In the context of software, the blocks in the figures may represent computer-executable instructions that, when executed by one or more processors, cause the one or more processors to perform the recited operations. Computer-executable instructions may include routines, programs, objects, components, data structures, and the like that cause the particular functions to be performed or particular abstract data types to be implemented.

Figure 2:
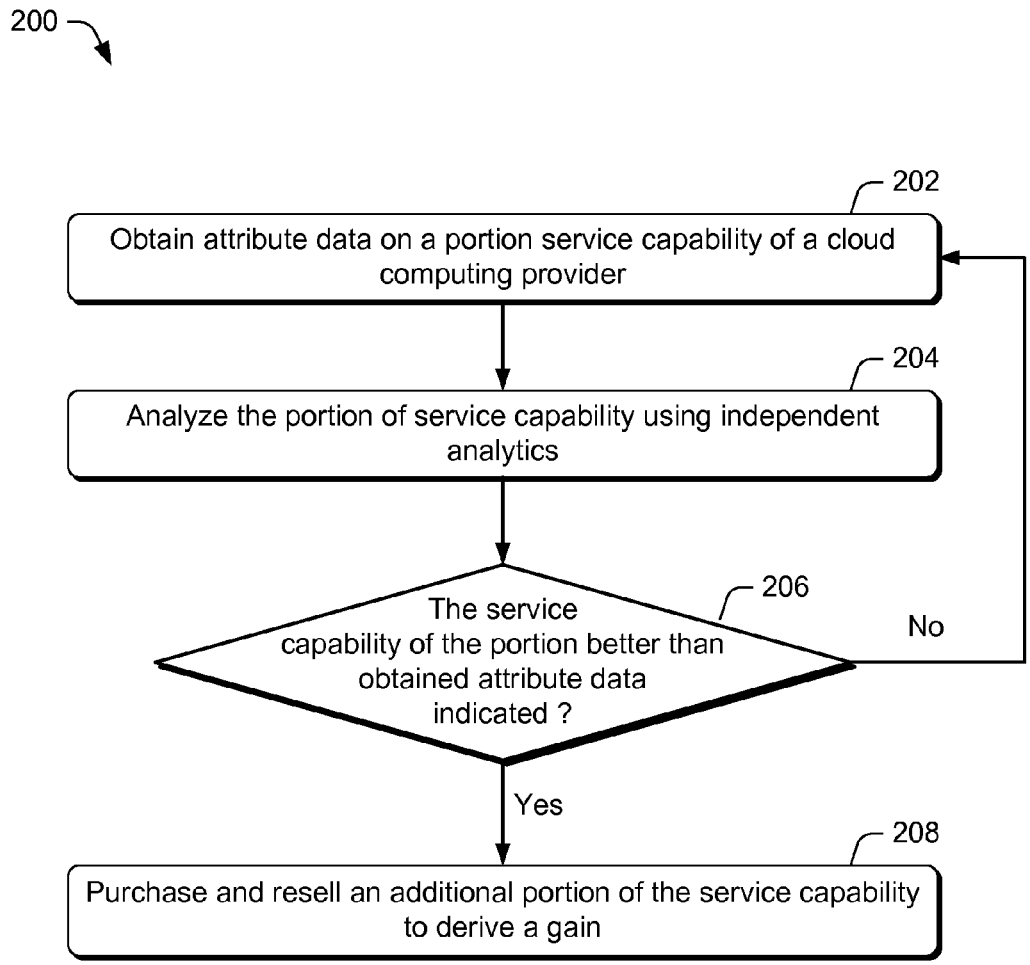
FIG. 2 shows a flow diagram illustrating an exemplary process used by a cloud computing resource broker to redistribute the service capabilities of a cloud computing providers based on performance attributes, in accordance with various embodiments.

FIG. 2 shows a flow diagram illustrating an exemplary process 200 used by a cloud computing resource broker to redistribute the service capabilities of a cloud computing provider based on performance attributes, in accordance with various embodiments. It will be appreciated that while process 200 is described below with respect to cloud computing provider 102(1), the process 200 may be implemented for any of the cloud computing providers 102(1)-102(n).

At block 202, the resource broker 110 may obtain attribute data on a portion of the service capability of a cloud computing provider, such as the cloud computing provider 102(1). In various embodiments, the portion of the service capability may be applicable for a specific time period. Moreover, the attribute data may include measurements such as response latency, amount of bandwidth, amount of memory, amount of storage capacity, cost of obtaining the solution, security strength, and/or the like. For example, but not as a limitation, the cloud computing provider 102(1) may supply the attribute data to the resource broker 110 as part of a business agreement.

At block 204, the resource broker 110 may analyze the portion of service capability from the cloud computing provider 102(1) using custom analytics. In various embodiments, the analytics may be developed by the resource broker 110, or obtained from an outside party. The custom analytics may include machine learning tools that collect data and predict outcomes using predictive models. In various embodiments, the analytics may provide independently-derived attribute data regarding response latency, amount of bandwidth, amount of memory, amount of storage capacity, cost of obtaining the solution, security strength, and/or the like.

At decision block 206, the resource broker 110 may compare the independently derived attribute data to the attribute data obtained from the cloud computing provider 102(1). By using this comparison, the resource broker 110 may determine whether the attributes of the portion of the service capability, as indicated by the independently derived attribute data, is better than that indicated by the obtained attribute data. For example, but not as a limitation, the resource broker 110 may determine that the response latency of the cloud computing provider 102(1) during a certain time period in a day of the week, (e.g., night time), is actually shorter, and therefore superior, to the response latency indicated by the attribute data obtained from the cloud computing provider 102. In another example, the resource broker 110 may determined that the service capability has experienced fewer instances of successful intrusion than as indicated by the obtained attribute data.

Thus, if the resource broker 110 determines that the attributes of the portion of the service capability, as supplied by the cloud computing provider 102(1), is superior than that indicated by the obtained attribute data ("yes" at decision block 206), the process may proceed to block 208.

At block 208, the resource broker 110 may purchase at least another portion of the service capability from the cloud computing provider 102(1) that shares similar attributes as the analyzed portion of the service capability. For example, but not as a limitation, the resource broker 110 may purchase the additional portion of service capability that occupies, or substantially occupies, the same time period in a day of the week as the analyzed portion of service capability. In this way, the additional portion of service capability may have the same or similar response latency as the analyzed portion of service capability. In another example, the resource broker 110 may purchase the additional service capability as it is likely protected by the same security software as the analyzed portion of service capability. In various embodiments, the resource broker 110 may make the purchase via an electronic sales transaction.

Furthermore, the resource broker 110 may further sell the additional portion of the service capability to one or more customers 104. In various embodiments, the resource broker 110 may derive a gain by selling the additional portion of the at least one service capability at a price that is higher than the original cost paid to the cloud computing provider 102(1). In some embodiments, the resource broker 110 may rebrand the at least one portion of the service capability prior to the sale. In various embodiments, the sale and payment may be implemented as electronic transactions over the network infrastructure 106.

However, if the resource broker 110 determines that the attributes of the portion of the service capability, as indicated by independently derived attribute data, is not superior than that indicated by the obtained attribute data ("no" at decision block 206), the process 200 may loop back to block 202, at which point the resource broker 106 may obtain additional attribute data on the service capability of a cloud computing provider 102(1) and perform further independent analysis.

Figure 3:
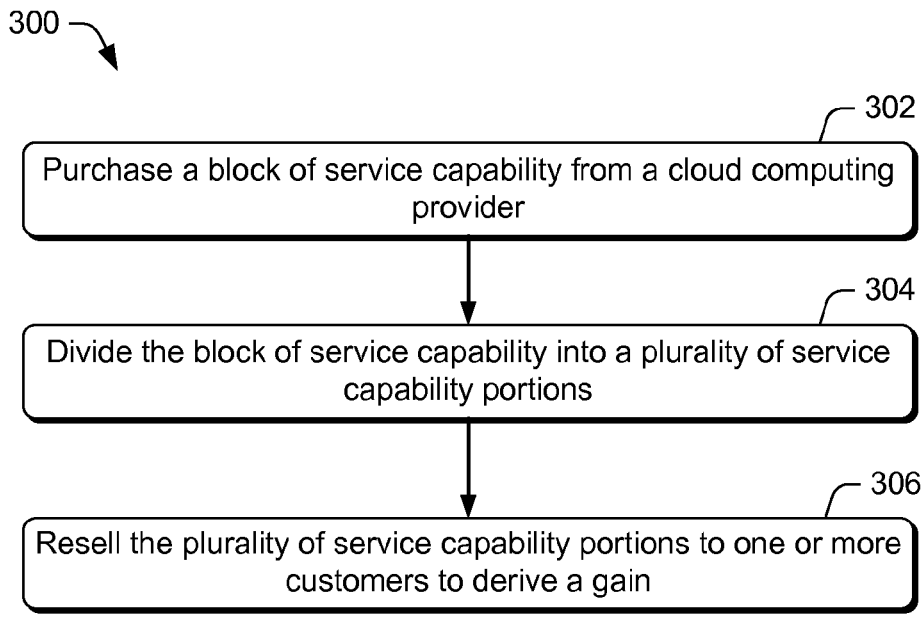
FIG. 3 shows a flow diagram illustrating an exemplary process used by a cloud computing resource broker to abstract and redistribute the service capability of a cloud computing provider to a plurality of customers, in accordance with various embodiments.

FIG. 3 shows a flow diagram illustrating an exemplary process 300 used by a cloud computing resource broker to divide and redistribute the service capabilities of a cloud computing provider to a plurality of customers, in accordance with various embodiments. It will be appreciated that while process 300 is described below with respect to cloud computing provider 102(1), the process 300 may be implemented for any of the cloud computing providers 102(1)-102(n).

At block 302, the resource broker 110 may purchase a block of service capability from a cloud computing provider 102(1). In various embodiments, the block of service capability may be for a predetermined time period. The block of service capability may meet certain performance attributes. For example, but not as a limitation, the block of service capability may have a response latency that is shorter than a predetermined length of time. In various embodiments, the resource broker 110 may make the purchase via an electronic sales transaction.

At block 304, the resource broker 110 may divide the block of service capability into a plurality of service capability portions. In various embodiments, the resource broker 110 may divide the block of service capability into portions according to time, processing bandwidth, memory allocation, data storage allocation, and/or the like.

At block 306, the resource broker 110 may sell the service capability portions to one or more customers 104. In various embodiments, the resource broker 110 may derive a gain by selling the service capability portions so that the overall profit is higher than the original cost paid to the cloud computing provider 102(1) for the block of service capability. In this way, the resource broker 110 may realize a gain from the sales transactions. In various embodiments, the sale and payment may be implemented as electronic transactions over the network infrastructure 106.

Figure 4:
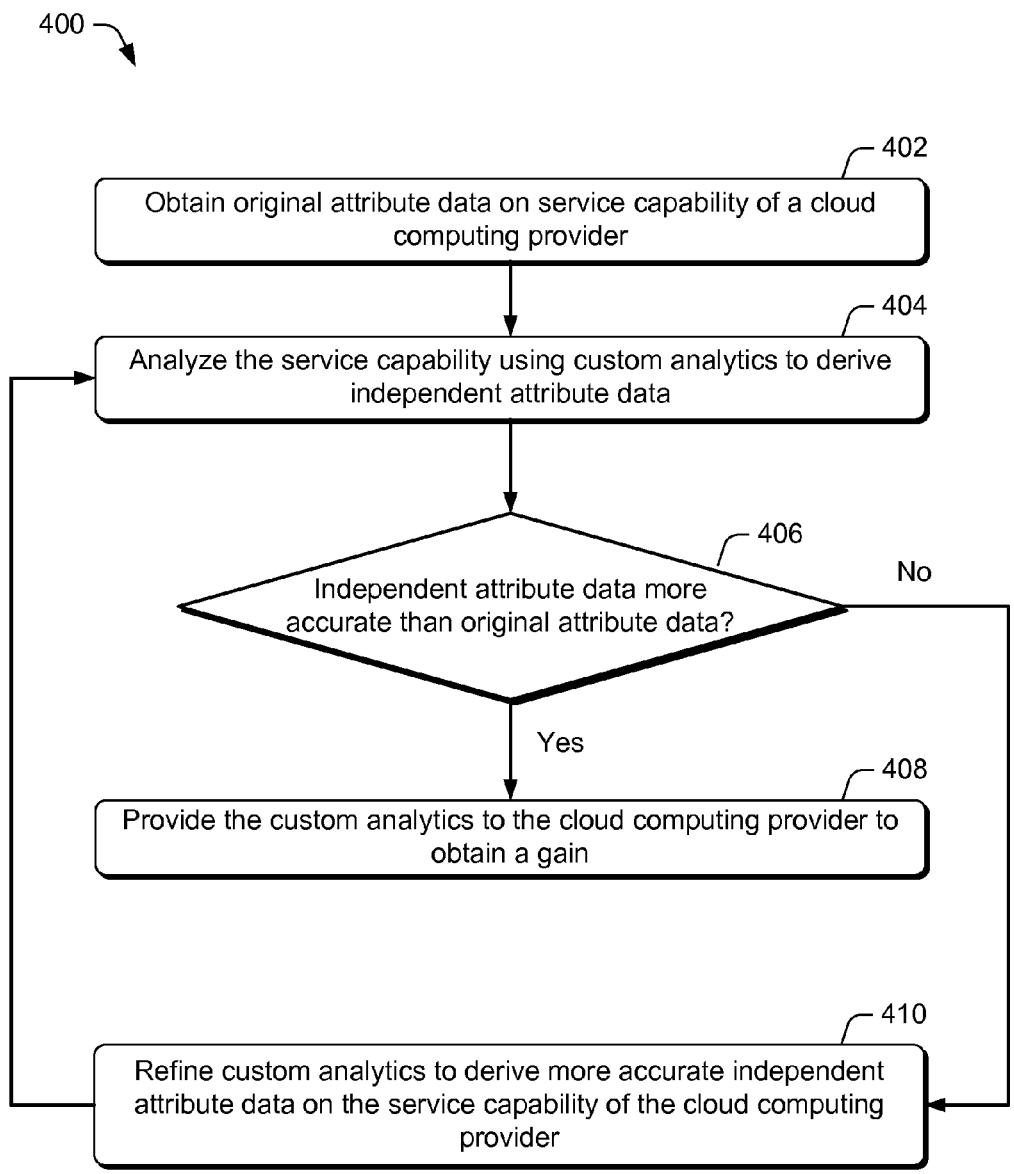
FIG. 4 shows a flow diagram illustrating an exemplary process used by a cloud computing resource broker to provide refined performance analytics to a cloud computing provider, in accordance with various embodiments.

FIG. 4 shows a flow diagram illustrating an exemplary process 400 used by a cloud computing resource broker to provide refined performance analytics to a cloud computing provider, in accordance with various embodiments. It will be appreciated that while process 400 is described below with respect to cloud computing provider 102(1), the process 400 may be implemented for any of the cloud computing providers 102(1)-102(n).

At block 402, the resource broker 110 may obtain attribute data on a portion of the service capability of the cloud computing provider 102(1). In various embodiments, the portion of the service capability may be for a specific time period. Moreover, the attribute data may include measurements such as response latency, amount of band width, amount of memory, amount of storage capacity, cost of obtaining the solution, security strength, and/or the like. For example, but not as a limitation, the cloud computing provider 102(1) may supply the attribute data to the resource broker 110 as part of a business agreement.

At block 404, the resource broker 110 may analyze the portion of service capability from the cloud computing provider 102(1) using custom analytics to obtain independent attribute data. In various embodiments, the analytics may be developed by the resource broker 110, or obtained from another party. The custom analytics may include machine learning tools that collect data and predict outcomes using predictive models. In various embodiments, the analytics may provide independent-derived measurements regarding response latency, amount of bandwidth, amount of memory, amount of storage capacity, cost of obtaining the solution, security strength, and/or the like for the portion of service capability. Moreover, the resource broker 110 may perform further standardized control bench mark tests and/or use sample computing tasks with known results to ensure the performance of the custom analytics and the accuracy of the independently derived attribute data.

At decision block 406, the resource broker 110 may determine whether the independently derived attribute data is more accurate than the obtained attribute data. In various embodiments, the resource broker 110 may assume that each of the obtained attributed data is less accurate than its corresponding independently derived attribute date if variability between the two exceeds one or more predetermined statistical thresholds (e.g., ±10% deviation).

Thus, if the resource broker 110 determines that the independent attribute data, as obtained via the custom analytics of the resource broker 110, is more accurate than the original attribute data obtained from the cloud computing provider 102 ("yes" at decision block 406), the process 400 may proceed to block 408.

At block 408, the resource broker 110 may provide the custom analytics to the cloud computing provider 102(1) to obtain a gain. In various embodiments, the resource broker 110 may sell or license the custom analytics to the cloud computing provider 102(1). In various embodiments, the sale or licensing, as well as the payment may be implemented as electronic transactions over the network infrastructure 106.

However, if the resource broker 110 determines that the independent attribute data, as obtained via the custom analytics of the resource broker 110, is not more accurate than the original attribute data obtained from the cloud computing provider 102 ("no" at decision block 406), the process 400 may proceed to block 410.

At block 410, the resource broker 110 may refine the custom analytics so that more accurate independent attribute data on the service capability of the cloud computing provider 102(1) may be derived. Subsequently, the process 400 may loop back to block 404, so that the resource broker 110 may further analyze the service capabilities of the cloud computing provider 102(1) using custom analytics to obtain independent attribute data.

Figure 5:
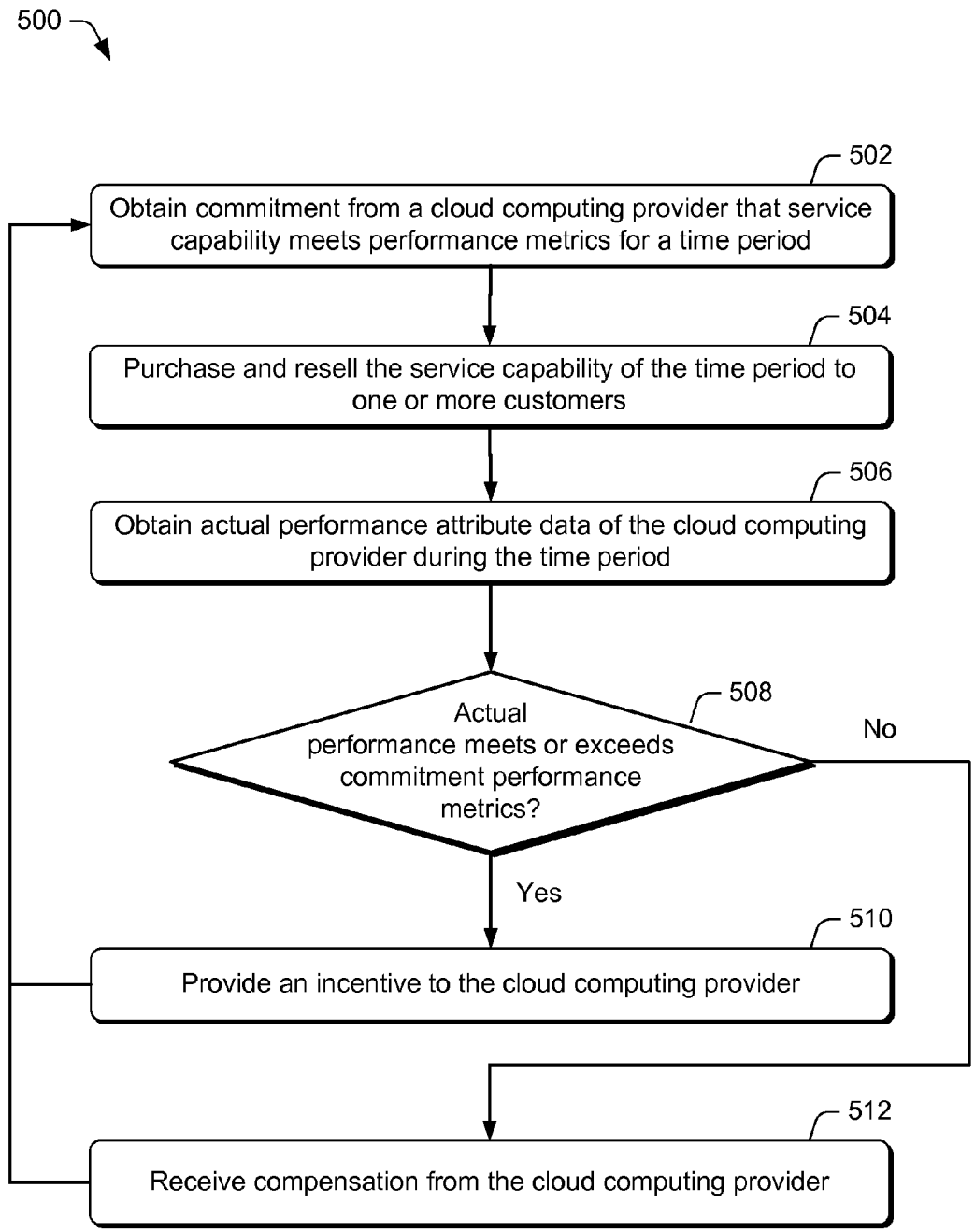
FIG. 5 shows a flow diagram illustrating an exemplary process used by a cloud computing resource broker to incentivize a cloud computing provider for the benefit of customers, in accordance with various embodiments.

FIG. 5 shows a flow diagram illustrating an exemplary process 500 used by a cloud computing resource broker to incentivize a cloud computing provider for the benefit of customers, in accordance with various embodiments. It will be appreciated that while process 500 is described with respect to cloud computing provider 102(1), the process 500 may be implemented for any of the cloud computing providers 102(1)-102(n).

At block 502, the resource broker 110 may obtain a commitment from a cloud computing provider 102(1) that the service capability of the cloud computing provider 102 meets certain performance metrics for a predetermined time period. For example, but not as limitations, the resource broker 110 may obtain an commitment that the response latency will be shorter than a certain threshold, that the security of the service capability will meet a certain requirement, and/or that the cloud computing provider 102(1) will dedicate a certain amount of processing bandwidth to one or more computing tasks. In some embodiments, the resource broker 110 may obtain the commitment metrics from the cloud computing provider 102(1) after modeling the expected performance attributes of the cloud computing provider 102 for the time period using independent analytics.

At block 504, the resource broker 110 may purchase the service capability of the cloud computing provider 102(1) for the time period and sell the service capability to one or more customers 104. The resource broker 110 may make the purchase via an electronic sales transaction. In various embodiments, the resource broker 110 may derive a gain by selling the service capability at a price that is higher than the original cost paid to the cloud computing provider 102(1) to realize a gain. In some embodiments, the resource broker 110 may divide the service capability into portions for resale, as described in the process 300 shown in FIG. 3. In various embodiments, the sales and payments may be implemented as electronic transactions over the network infrastructure 106.

At block 506, the resource broker 110 may obtain the actual performance attribute data of the service capability provided by the cloud computing provider 102(1) during the time period. In some embodiments, the cloud computing provider 102(1) may supply the attribute data to the resource broker 110 as part of a business agreement. In other embodiments, the resource broker 110 may obtain the actual performance attribute data using custom analytics.

At decision block 508, the resource broker 110 may determine whether the actual performance of the service capability of the cloud computing provider 102(1) meet or exceed the commitment performance metrics. If the resource broker 110 determines that the actual performance meets or exceeds the commitment performance ("yes" at decision block 508), the process 500 may proceed to block 510.

At block 510, the resource broker 110 may provide an incentive to the cloud computing provider 102(1). In some embodiments, the incentive may be monetary compensation. In other embodiments, the incentive may be a commitment to purchase additional service capabilities from the resource broker 110. Subsequently, the process 500 may loop back to block 502, at which point the resource broker 110 may obtain additional performance commitments. It will be appreciated that in other embodiments, the resource broker 110 may provide an incentive to the cloud computing provider 102 only when the actual performance exceeds the commitment performance.

However, if the resource broker 110 determines that the actual performance is below the commitment performance ("no" at decision block 508), the process 500 may proceed to block 512.

At block 512, the resource broker 110 may receive compensation from the cloud computing provider 102(1) for failing to meet the performance commitment. Subsequently, the process 500 may loop back to block 502, at which point the resource broker 110 may obtain additional performance commitments.

Figure 6:
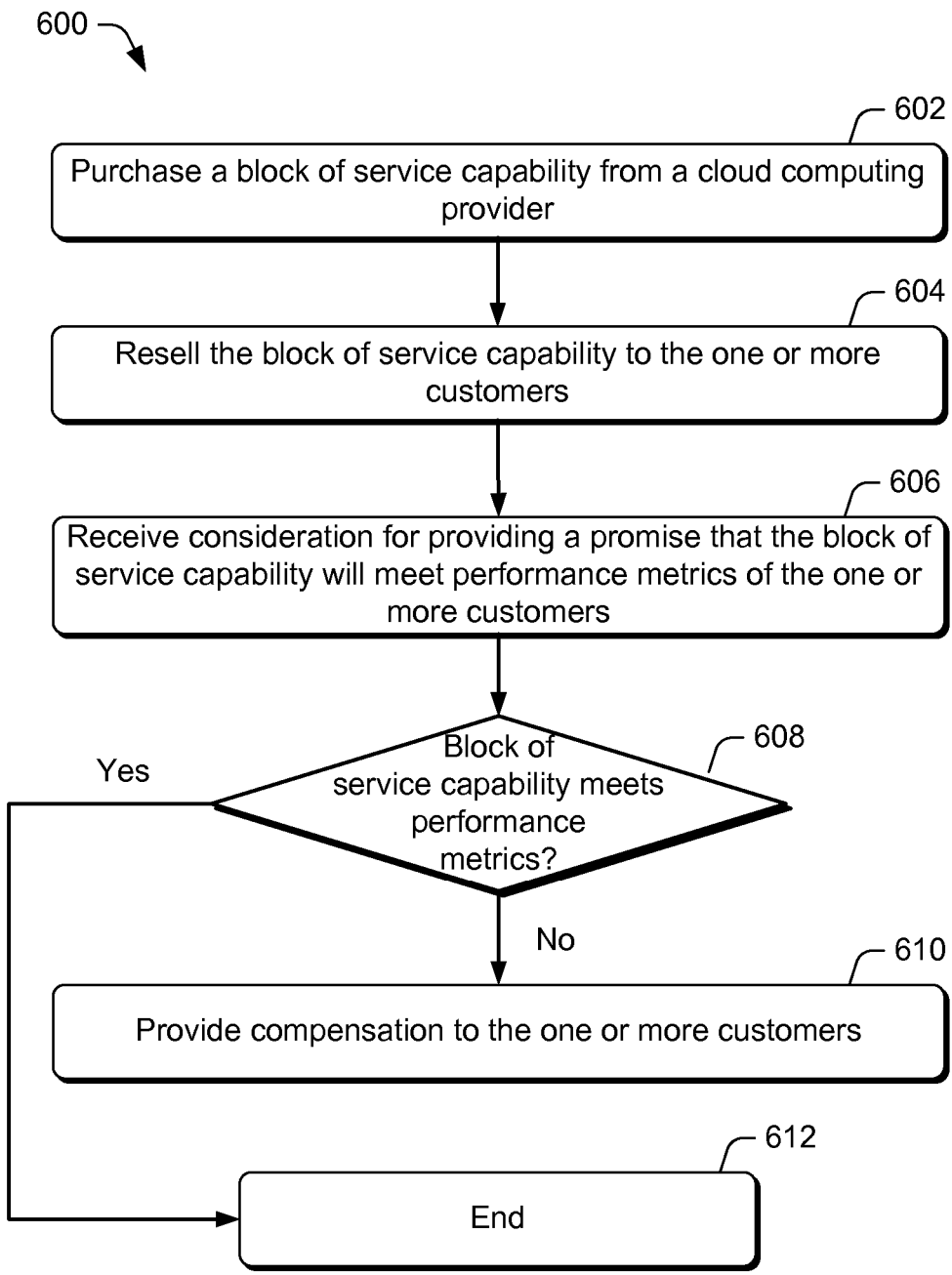
FIG. 6 shows a flow diagram illustrating an exemplary process used by a cloud computing resource broker to provide assurance that the service capability of a cloud computing provider meets pre-determined metrics, in accordance with various embodiments.

FIG. 6 shows a flow diagram illustrating an exemplary process 600 used by a cloud computing resource broker to provide assurance that the service capabilities of a cloud computing provider meets pre-determined metrics, in accordance with various embodiments. It will be appreciated that while process 600 is described with respect to cloud computing provider 102(1), the process 600 may be implemented for any of the cloud computing providers 102(1)-102(n).

At block 602, the resource broker 110 may purchase a block of service capability from a cloud computing provider 102(1). The resource broker 110 may make the purchase via an electronic sales transaction. In various embodiments, the block of service capability may be for a predetermined time period. The block of service capability may meet certain performance attributes. For example, but not as a limitation, the block of service capability may have a response latency that is shorter than a predetermined length of time.

At block 604, the resource broker 110 may sell the block of service capability to one or more customers 104. In various embodiments, the resource broker 110 may derive a gain by selling the block of service capability at a price that is higher than the original cost paid to the cloud computing provider 102(1). In some embodiments, the resource broker 110 may divide the service capability into portions prior to resale, as described in the process 300 shown in FIG. 3. In various embodiments, the sales and payments may be implemented as electronic transactions over the network infrastructure 106.

At block 606, the resource broker 110 may receive consideration from each of the one or more customers 104 in exchange for providing promises, i.e., insurance, that performance of the block of service capability will meet certain performance metrics for each customer. For example, but not as a limitation, the resource broker 106 may promise each of customers 104 that the service capability has a response latency that is shorter than a predetermined length of time. In other examples, the promise may be that each of customers 104 is to receive a certain processing bandwidth, memory allocation, and/or data storage allocation. The consideration may be in the form of monetary payment, and/or a commitment to purchase additional service capability from the resource broker 110. In various embodiments, the resource broker 110 may make different promises to different ones of customers 104 depending on the value of the consideration paid by each of the customers 104.

At decision block 608, the resource broker 110 may determine whether the block of service capability meets the performance metrics of the one or more customers 104. In various embodiments, this determination may be made for each of customers 104 depending on the individual guarantee made. Thus, if the resource broker 110 determines that performance of the block of service capability does not meet the performance metrics for one or more customers 104, the process 600 may proceed to block 610.

At block 610, the resource broker 110 may compensate each of the one or more customers 104 for which performance metrics of the provided service capability were not met. In various embodiments, the compensation may be in the form of monetary reimbursement and/or the provision of future service capability to the customer at no cost. However, if the resource broker 110 determines that the block of service capability meets the performance of each customer, the process 600 may terminate at block 612, as no compensation to the one or more customers 104 is needed.

Figure 7A:
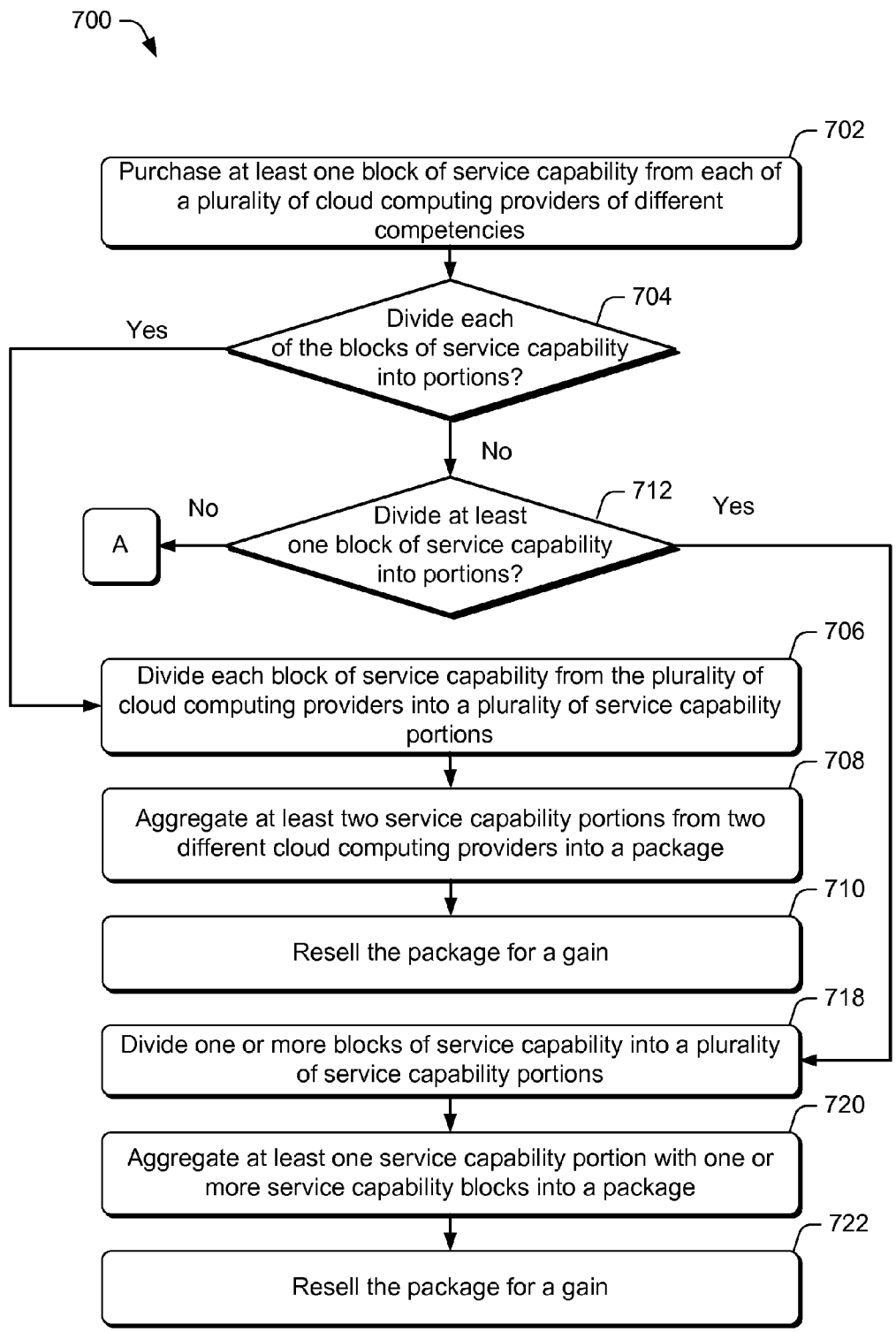
FIGS. 7a and 7b show a flow diagram illustrating an exemplary process used by a cloud computing resource broker to provide aggregated service capability portions from cloud computing providers to customers, in accordance with various embodiments.
Figure 7B:
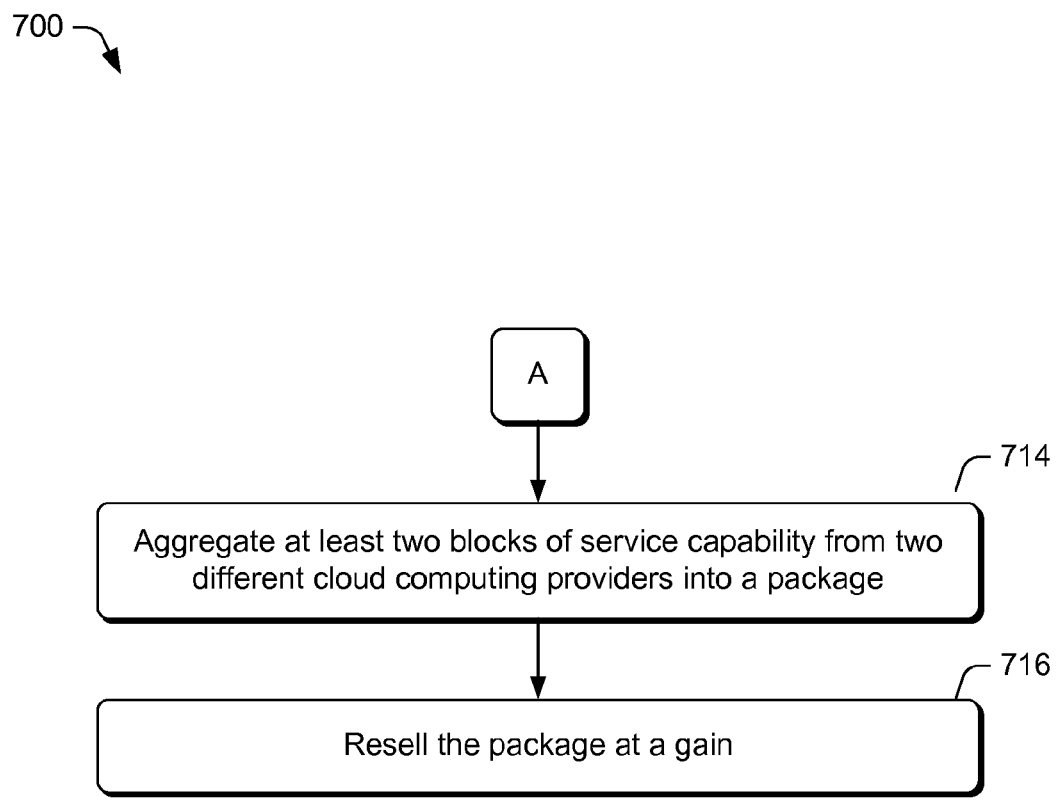

FIGS. 7a and 7b show a flow diagram illustrating an exemplary process used by a cloud computing resource broker to provide aggregated service capability portions from cloud computing providers to customers, in accordance with various embodiments.

At block 702, the resource broker 110 may purchase at least one block of service capability from each of a plurality of cloud computing providers 102(1)-102(n). The resource broker 110 may make the purchase via an electronic sales transaction. In various embodiments, each of the plurality of cloud computing providers 102(1)-102(n) may have different competencies. For example, but not as a limitation, a first of the cloud computing providers 102(1)-102(n) may be especially adept at providing search optimization services, while a second of the cloud computing providers 102(1)-102(n) may be particularly proficient at providing data storage and retrieval services.

At decision block 704, the resource broker 110 may decide whether to divide each block of service capabilities, as purchased from the plurality of cloud computing providers 102(1)-102(n), into service capability portions. If the resource broker 110 decides to divide each block of service capability into portions ("yes" at decision block 704), the process 700 may proceed to block 706.

At block 706, the resource broker 110 may divide each block of service capability into a plurality of service capability portions. In various embodiments, the resource broker 110 may divide each block of service capability into portions according to time, processing bandwidth, memory allocation, data storage allocation, and/or the like.

At block 708, the resource broker 110 may aggregate at least two service capability portions from two or more of the cloud computing providers 102(1)-102(n) into a package. For example, but not as a limitation, the package may include a search optimization service capability portion from a first cloud computing provider, and a data storage and retrieval service capability portion from a second cloud computing provider.

At block 710, the resource broker 110 may sell the package to at least one of customers 104 for a gain that is derived from the difference between the price paid for the respective portions and the sale price. In various embodiments, the sale and payment may be implemented as electronic transactions over the network infrastructure 106.

However, returning to decision block 704, if the resource broker 110 decides to not divide each block of service capability into portions ("no" at decision block 704), the process 700 may proceed to block decision 712.

At decision block 712, the resource broker 110 may decide whether at least one block of service capability is to be divided into a plurality of portions. If the resource broker 110 decides that no block of service capability is to be divided into a plurality of portions ("no" at decision block 712), the process may proceed to block 714.

At block 714, the resource broker 110 may aggregate at least two blocks of service capabilities from two different cloud computing providers 102(1)-102(n) into a package. For example, but not as a limitation, the package may include a search optimization service capability block from a first cloud computing provider and a data storage and retrieval service capability block from a second cloud computing provider.

At block 716, the resource broker 110 may sell the package to one or more of customers 104 for a gain that is derived from the difference between the price paid for the respective blocks and the sale price. In various embodiments, the sales and payments may be implemented as electronic transactions over the network infrastructure 106.

However, returning to decision block 712, if the resource broker 110 decides to divide at least one block of service capability into portions ("yes" at block 712), the process 700 may proceed to block 718.

At block 718, the resource broker 106 may divide one or more blocks of service capabilities into a plurality of service capability portions. In various embodiments, the one or more blocks of service capabilities may be from different ones of cloud computing providers 102(1)-102(n).

At block 720, the resource broker 110 may aggregate at least one service capability portion with one or more service capability blocks into a package. For example, but not as a limitation, the package may include a search optimization service capability portion from a first cloud computing provider, and a block of data storage and retrieval service capability from a second cloud computing provider.

At block 722, the resource broker 110 may sell the package to one or more of customers 104 for a gain that is derived from the difference between the price paid for the respective portions and blocks and the sale price. In various embodiments, the sales and payments may be implemented as electronic transactions over the network infrastructure 106.

Figure 8:
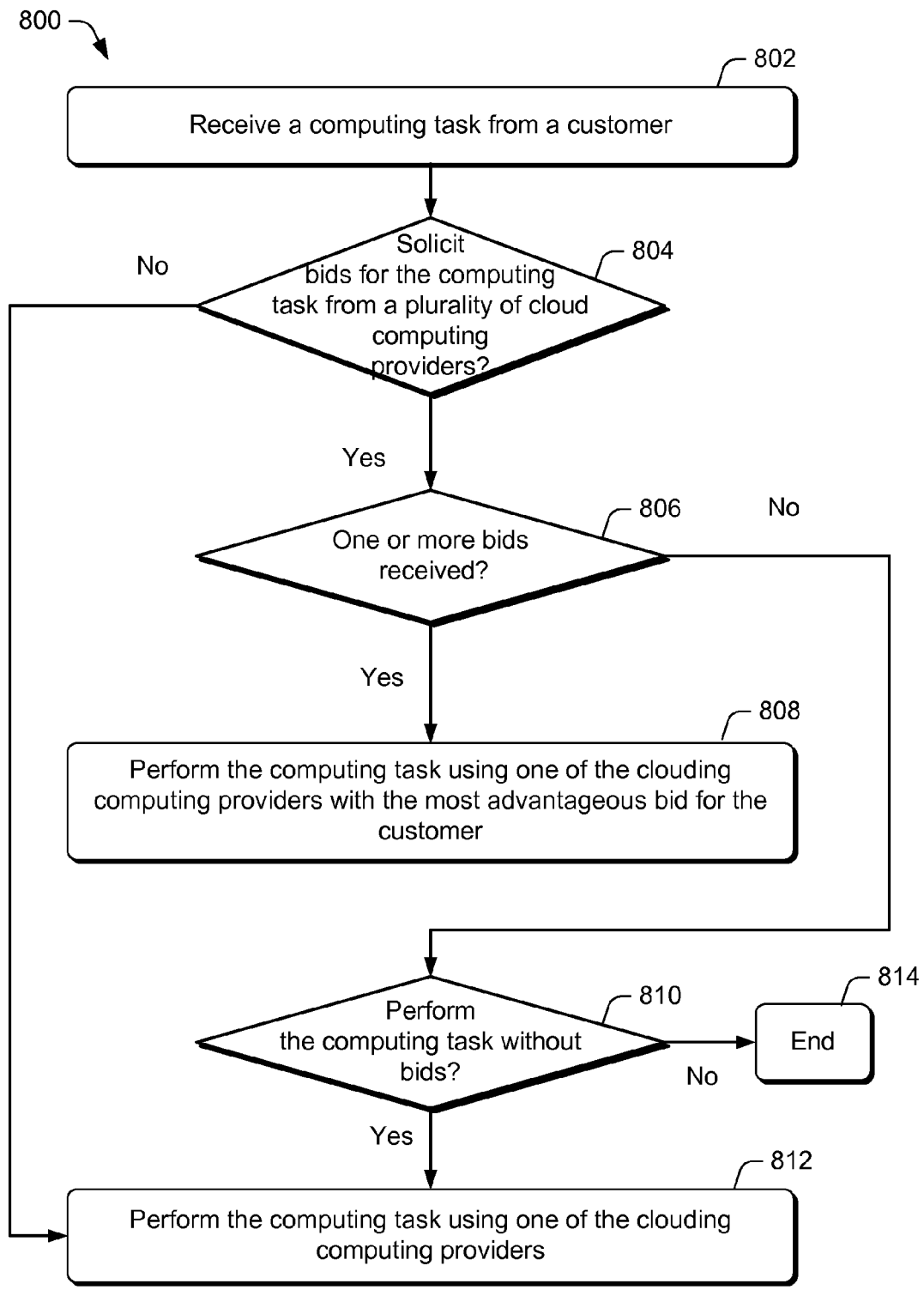
FIG. 8 shows a flow diagram illustrating an exemplary process used by a cloud computing resource broker to obtain cost-effective service capabilities from the cloud computing providers for a customer, in accordance with various embodiments.

FIG. 8 shows a flow diagram illustrating an exemplary process 800 used by a cloud computing resource broker to obtain cost-effective service capabilities from the cloud computing providers for a customer, in accordance with various embodiments.

At block 802, the resource broker 110 may received a computing task from a customer 104. In various embodiments, the computing task may be any task that is suitable for performance using cloud computing. For example, but not as a limitation, the computing task may be the optimization of a database by at least one of cloud computing providers 102(1)-102(n).

At decision block 804, the resource broker 110 may decide whether to solicit bids from a plurality of cloud computing providers 102(1)-102(n) for the performance of the computing task. In various embodiments, the bids may be for the lowest cost for the performance of the computing, the shortest response latency, the shortest computing task completion time, and/or other performance characteristics desired by the customer. If the resource broker 110 decides that bids should be solicited ("yes" at decision block 804), the process 800 may proceed to decision block 806. In some embodiments, the bids may be solicited via an auction. For example, but not as a limitation, the auction may be an English auction, a Dutch auction, or a Vickery auction. In at least one embodiment, the auction may be conducted in real time following the receipt of the computing task. In various embodiments, the resource broker 110 may solicit the bids via electronic bidding, such as via an electronic auction website.

At decision block 806, the resource broker 110 may determine whether one or more bids are received from the plurality of cloud computing providers 102(1)-102(n) for the performance of the computing task. If the resource broker 110 determines that one or more bids are received ("yes" at decision block 806), the process 800 may proceed to block 808.

At block 808, the resource broker 110 may perform the computing task using the one of cloud computing providers 102(1)-102(n) that submitted the most advantageous bid for the customer. For example, but not as a limitation, the most advantageous bid may be the lowest cost bid for the performance of the computing task, the bid for the shortest latency response time during the performance of the computing task, or a bid for the shortest completion time for the computing task.

Returning to decisions block 806, if the resource broker 110 determines that no bids are received for the performance of the computing task ("no" at decision block 806), the process 800 may proceed to decision block 810.

At decision block 810, the resource broker 110 may determine whether the computing task should nevertheless be performed even though no bids have been received. In various embodiments, the resource broker 110 may make this decision based on consultation with the customer 104. In other embodiments, the resource broker 110 may make this decision based on a standing agreement with the requesting customer (e.g., no performance if no bids are received). If the resource broker 110 determines that the computing task should be performed ("yes" at decision block 810), the process 800 may proceed to block 812.

At block 812, the resource broker 110 may use one of the cloud computing providers 102(1)-102(n) to perform the computing task. In various embodiments, the resource broker 110 may select the one of cloud computing providers 102(1)-102(n) based on the competency. For example, but not as a limitation, when the computing task in database optimization, the resource broker 110 may select at least one of the cloud computing providers 102(1)-102(n) based on prior performance with database optimization tasks. In other embodiments, the resource broker 110 may select at least one of the cloud computing providers 102(1)-102(n) based on prior cost history, prior reliability history, etc.

However, if the resource broker 110 determines that the computing task should not be performed ("no" at decision block 810), the process 800 may proceed to block 814, at which point the process 800 may be terminated.

Finally, returning to decision block 804, if the resource broker 110 decides that no bids should be solicited ("no" at decision block 8045), the process 800 may proceed to block 812, where the resource broker 110 may use one of the cloud computing providers 102(1)-102(n) to perform the computing task.

It will be appreciated that while the process 800 is described with respect to a computing task received from the customer, the process 800 may be equally applicable to each portion of the computing task. In other words, the resource broker 110 may elect to abstract the computing task into a plurality of sub computing tasks, and then apply the process 800 to each of the sub computing tasks. For example, but not as a limitation, the customer may request a computing task to be performed, but lack the necessary expertise to define the computing task or understand specific steps for performing the computing tasks. In such an instance, the resource broker 110 may assist the customer by abstracting, that is, formulating the computing task into definitive sub computing tasks that may be implemented to perform the computing task.

Figure 9:
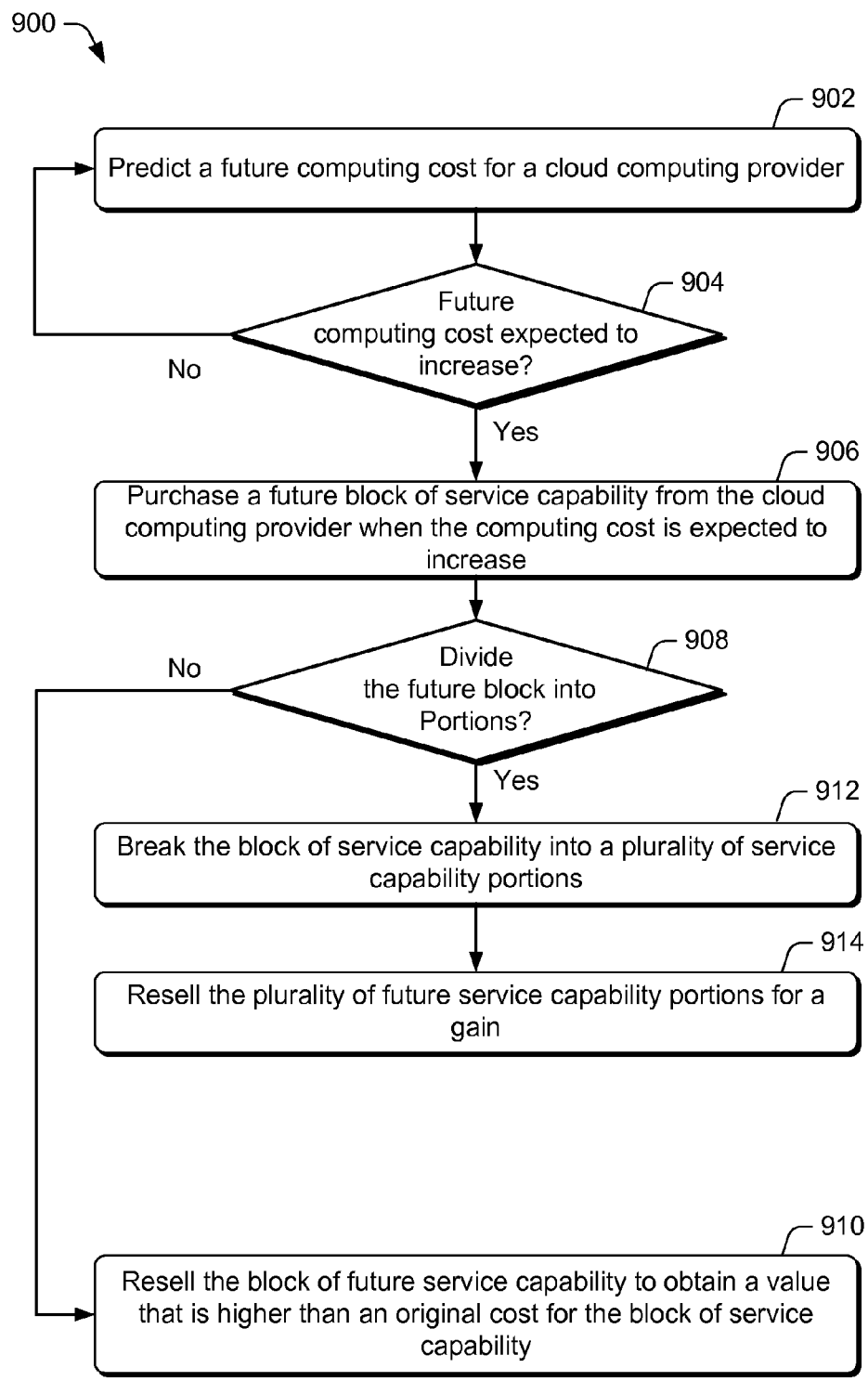
FIG. 9 shows a flow diagram illustrating an exemplary process used by a cloud computing resource broker to sell blocks of future service capabilities from cloud computing providers to customers, in accordance with various embodiments.

FIG. 9 shows a flow diagram illustrating an exemplary process used by a cloud computing resource broker to sell blocks of future service capabilities from cloud computing providers to customers, in accordance with various embodiments. It will be appreciated that while process 900 is described below with respect to cloud computing provider 102(1), the process 900 may be implemented for any of the cloud computing providers 102(1)-102(n).

At block 902, the resource broker 110 may analyze a future computing cost for a cloud computing provider, such as the cloud computing provider 102(1). In various embodiments, the resource broker 110 may perform the analysis of the future computing cost of the cloud computing provider 102(1) based on factors such as market trends, energy costs, computing technology developments, seasonal variations, and/or other relevant factors. In at least some embodiments, the analysis may be performed using machine learning tools that collect data and predict outcomes via predictive models.

At decision block 904, the resource broker 110 may determine whether the future computing cost of the cloud computing provider 102(1) is expected to increase over the current computing cost during a future time period. If the resource broker 110 determines that the future computing cost of the cloud computing provider 102(1) will not increase ("no" at decision block 904), the process 900 may loop back to block 902, where the further analysis may be conducted.

However, if the resource broker 110 determines that the future computing cost of the cloud computing provider 102(1) will increase ("yes" at decision block 904), the process 900 may proceed to block 906.

At block 906, the resource broker 110 may purchase a block of service capability from the cloud computing provider 102(1) for a future time when the computing cost is expected to increase. In various embodiments, the resource broker 110 may make the purchase via an electronic sales transaction.

At decision block 908, the resource broker 110 may decide whether the block of future service capability is to be divided into a plurality of portions. In various embodiments, the resource broker 110 may divide the block of future service capability into portions according to time, processing bandwidth, memory allocation, data storage allocation, and/or the like. If the resource broker 110 decides that the block of future service capability is not to be divided into a plurality of portions ("no" at decision block 908), the process may proceed to block 910.

At block 910, the resource broker 110 may derive a gain by selling the block of future service capability at a price that is higher than the original cost paid to the cloud computing provider 102(1). In some embodiments, the resource broker 110 may rebrand the at least one portion of the service capability prior to selling the block of future service capability. In various embodiments, the sale and payment may be implemented as electronic transactions over the network infrastructure 106.

However, if the resource broker 110 decides to divide the block of future service capability into a plurality of portions ("yes" at decision block 910), the process 900 may proceed to block 912.

At block 912, the resource broker 110 may divide the block of service capability into a plurality of service capability portions. In various embodiments, the resource broker 110 may divide the block of service capability into portions according to time, processing bandwidth, memory allocation, data storage allocation, and/or the like.

At block 914, the resource broker 110 may sell the future service capability portions to one or more customers 104. In various embodiments, the resource broker 110 may derive a gain by selling the future service capability portions so that the overall profit is higher than the original cost paid to the cloud computing provider 102(1) for the block of service capability. In this way, the resource broker 110 may realize a gain from the sales transactions. In at least one further embodiment, the resource broker 110 may rebrand the at least one portion of the service capability prior to selling portions of the future service capability. In various embodiments, the sale and payment may be implemented as electronic transactions over the network infrastructure 106.

Figure 10:
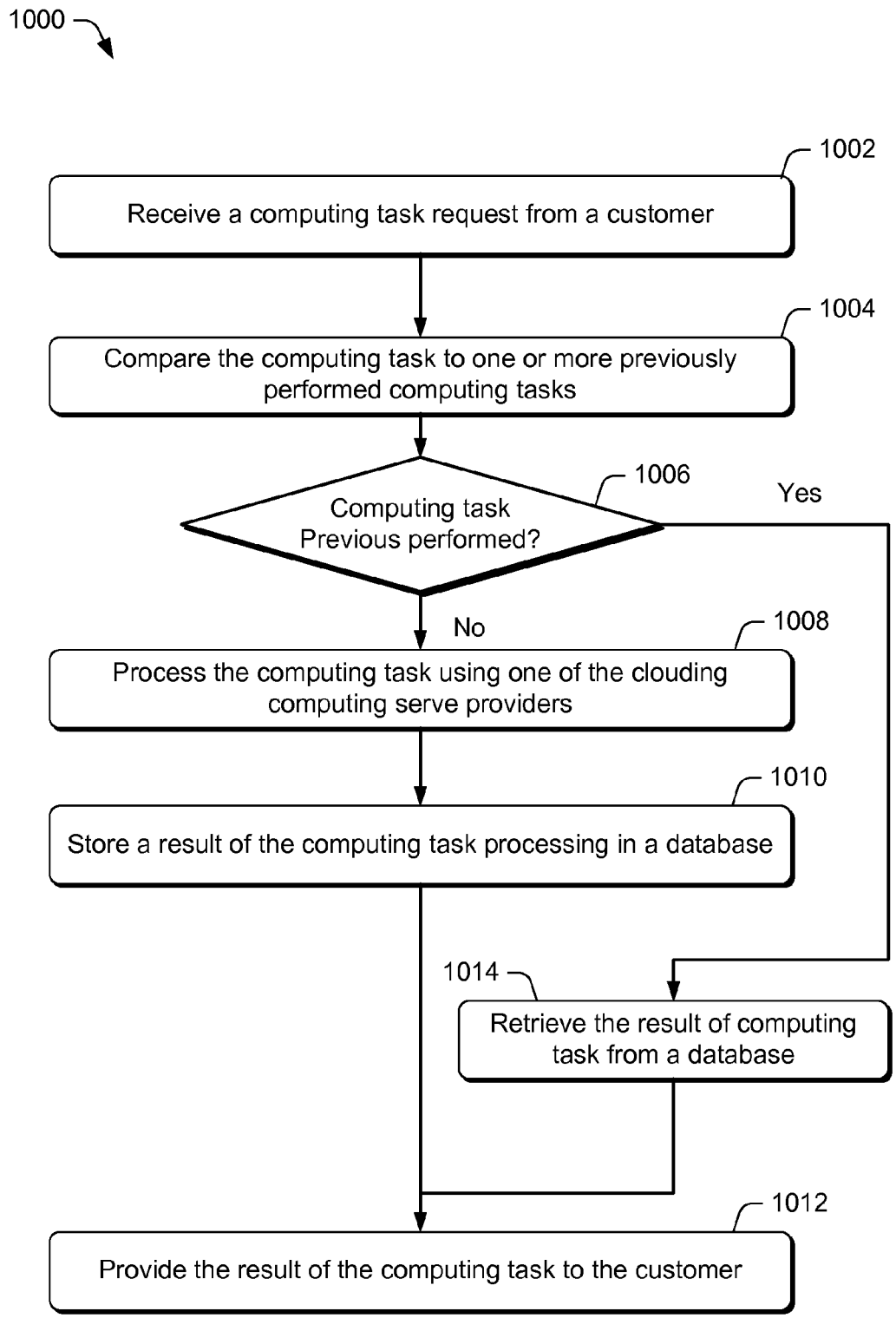
FIG. 10 shows a flow diagram illustrating an exemplary process used by a cloud computing resource broker to store and retrieve the result of a computing task and provide the result to customers, in accordance with various embodiments.

FIG. 10 shows a flow diagram illustrating an exemplary process 1000 used by a cloud computing resource broker to store and retrieve the result of a computing task and provide the result to customers, in accordance with various embodiments.

At block 1002, the resource broker 110 may receive a computing task request from a customer. In various embodiments, the computing task may be any task that is suitable for performance using cloud computing. For example, but not as a limitation, the computing task may be the optimization of a database by a cloud computing provider, such as one of the cloud computing provider 102(1)-102(n).

At block 1004, the resource broker 110 may compare the computing task that the customer requests to be performed to one or more previously performed computing tasks.

At decision block 1006, based on the comparison, the resource broker 110 may determine whether the requested computing task was previously performed. If the resource broker 110 determines that the computing task was not previously performed ("no" at decision block 1006), the process 1000 may proceed to block 1008.

At block 1008, resource broker 110 may select and use one of the cloud computing providers 102(1)-102(n) to process the computing task. In various embodiments, the resource broker 110 may select one of the cloud computing providers 102(1)-102(n) based on the competency. For example, but not as a limitation, when the computing task in database optimization, the resource broker 110 may select one of the cloud computing providers 102(1)-102(n) based on prior performance with database optimization tasks. In other embodiments, the resource broker 110 may select one of the cloud computing providers 102(1)-102(n) based on prior cost history, prior performance history, etc.

At block 1010, the resource broker 110 may store the result of the processed computing task in a database. In various embodiments, the database may reside with at least one of the cloud computing providers 102(1)-102(n), or the resource broker 110 may maintain its own database.

At block 1012, the resource broker 110 may provide the result of the computing task to the customer. In various embodiments, the resource broker 110 may receive a compensation for providing the results to the customer.

However, returning to decision block 1006, if the resource broker 110 determines that the computing task was previously performed ("yes" at decision block 1006), the process 100 may proceed to block 1014.

At block 1014, the resource broker 110 may retrieve the result of the computing task from the database. Subsequently, the process 1000 may proceed to block 1012, where the resource broker 110 may provide the result of the computing task to the customer in exchange for compensation.

It will be appreciated that while the process 1000 is described with respect to a computing task from the customer, the process 1000 may be equally applicable to each portion of the computing task. In other words, the resource broker 110 may elect to abstract the computing task into a plurality of sub computing tasks, and then apply the process 1000 to each of the sub computing tasks.

Figure 11:
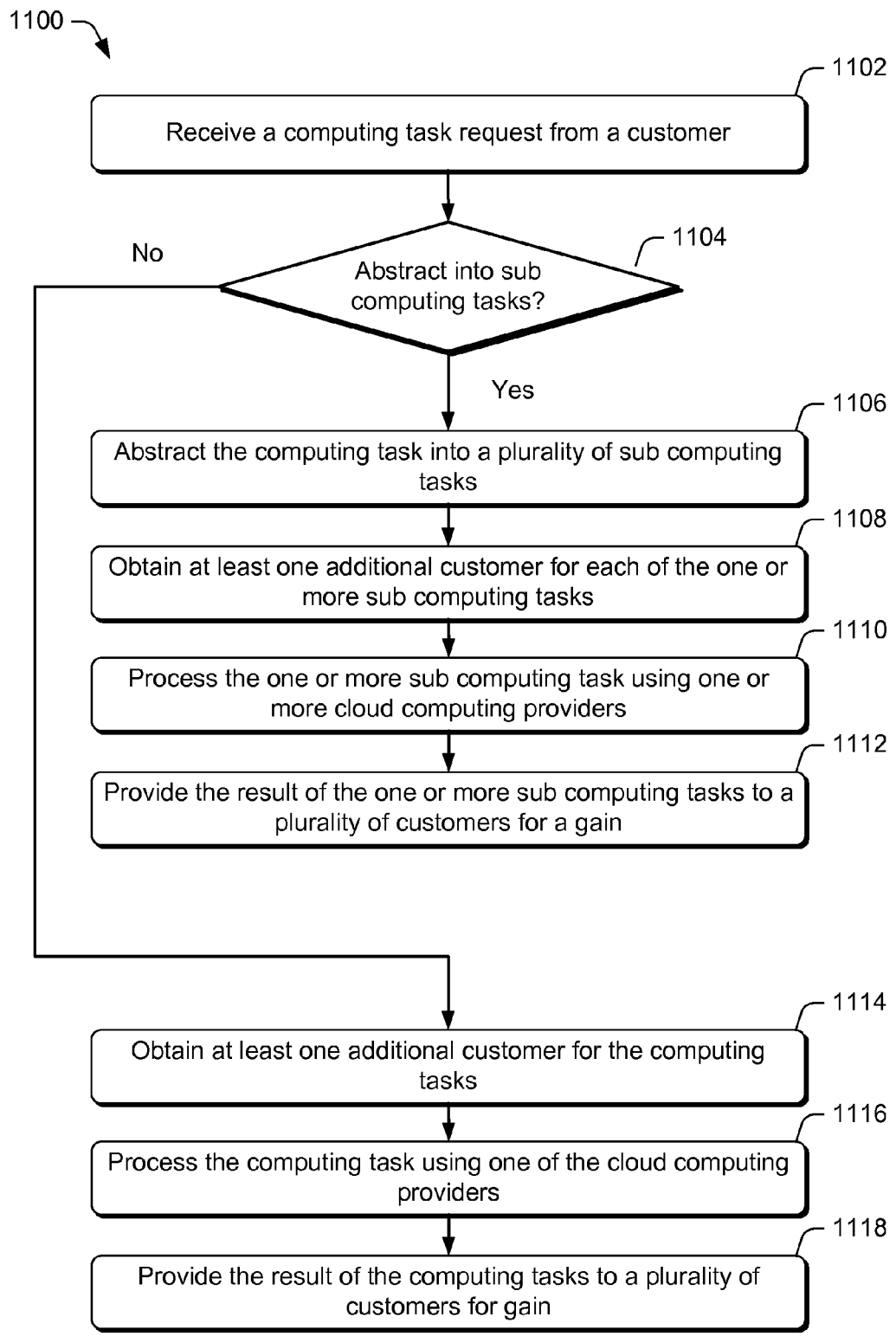
FIG. 11 shows a flow diagram illustrating an exemplary process used by a cloud computing resource broker to perform at least a portion of a computing task on behalf of a plurality of customers, in accordance with various embodiments.

FIG. 11 shows a flow diagram illustrating an exemplary process 1100 used by a cloud computing resource broker to perform at least a portion of a computing task on behalf of a plurality of customers, in accordance with various embodiments.

At block 1102, the resource broker 110 may receive a computing request from a customer. In various embodiments, the computing task may be any task that is suitable for performance using cloud computing. For example, but not as a limitation, the computing task may be the optimization of a database by one of cloud computing providers 102(1)-102(n).

At decision block 1104, the resource broker 110 may decide whether to abstract the requested computing task into sub computing tasks. If the resource broker 110 decides that the computing task may be abstracted into sub computing tasks ("yes" at decision block 1104), the process 1100 may continue to block 1106.

At block 1106, the resource broker 110 may abstract the computing tasks into a plurality of sub computing tasks. For example, but not as a limitation, the computing task may include a search optimization component and a data storage component. Thus, the resource broker 110 may abstract the computing task into a search optimization task and a data storage task.

At block 1108, the resource broker 110 may obtain at least one additional customer for one or more of the sub computing tasks. For example, but not as a limitation, one of the sub computing tasks may be a web indexing operation. Thus, at least one additional customer may desire to have the same computing task performed. In various embodiments, the resource broker 110 may enable the plurality of the customers 104 to share the cost of performing a sub computing task. In other embodiments, the resource broker 110 may enable each of the plurality of customers 104 who are "sharing" the performance of the sub computing task to pay a reduced price. The reduced price is discounted from the price each of the customers 104 would otherwise pay individually for performing the sub computing task.

At block 1110, the resource broker 110 may process the plurality of sub computing tasks using one or more cloud computing providers 102(1)-102(n). In various embodiments, the resource broker 110 may use a cloud computing provider with the lowest bid to perform each computing task, and/or select cloud computing providers based on prior performance or cost, as described in FIG. 8. The plurality of sub computing tasks may include at least one sub computing task that is to be performed for a plurality of customers 104.

At block 1112, the resource broker 110 may provide the results of the one more sub computing tasks to the plurality of the customers 104 for a gain. The gain may be derived from the difference between the cost charged by the one or more cloud computing providers 102(1)-102(n), and the fee paid by the plurality of customers 104.

However, returning to block 1104, if the resource broker 110 decides that the computing task does not need to be abstracted into sub computing tasks ("no" at decision block 1104), the process 1100 may proceed to block 1114.

At block 1114, the resource broker 110 may obtain at least one additional customer for the computing task. For example, but not as a limitation, the computing task may be the modeling and forecasting regional weather for a specific duration of time (e.g., couple of weeks). Thus, at least one additional customer may desire to have the same computing task performed. In various embodiments, the resource broker 110 may enable the plurality of the customers 104 to share the cost of performing the computing task. In other embodiments, the resource broker 110 may enable each of the plurality of customers 104 who are "sharing" the performance of the computing task to pay a reduced price. The reduced price may be discounted from the price each of the customers 104 would otherwise pay individually for performing the computing task.

At block 1116, the resource broker 110 may process the plurality of the computing tasks using one of the cloud computing providers 102(1)-102(n). In various embodiments, the resource broker 110 may use one of the cloud computing providers 102(1)-102(n) with the lowest bid to perform the computing task, and/or select one of the cloud computing providers 102(1)-102(n) based on prior performance or cost, as described in FIG. 8.

At block 1118, the resource broker 110 may provide the results of the computing task to the plurality of the customers 104 for a gain. The gain may be derived from the difference between the cost charged by the one of the cloud computing providers 102(1)-102(n) and the fee paid by the plurality of customers 104.

Figure 12:
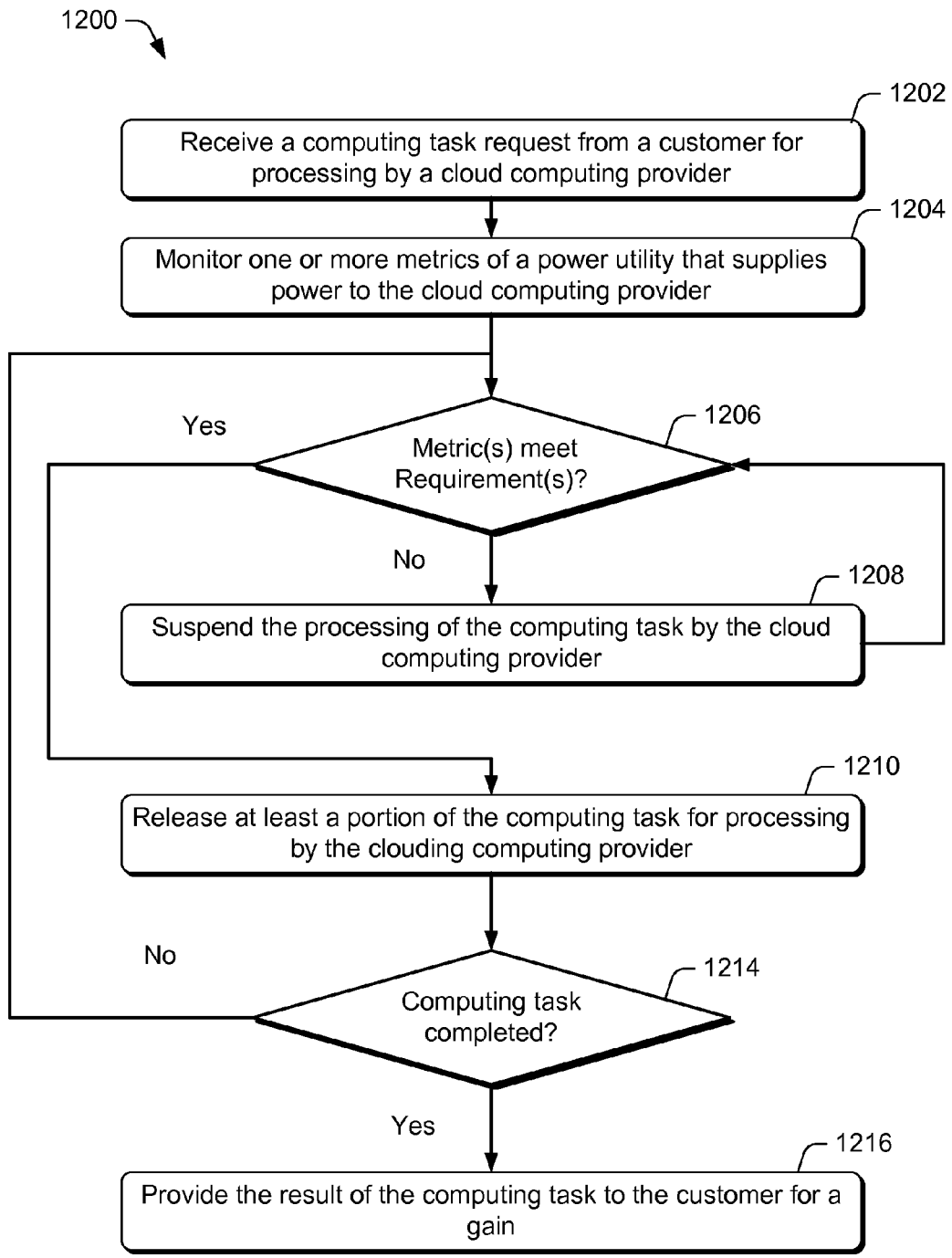
FIG. 12 shows a flow diagram illustrating an exemplary process used by a cloud computing resource broker to coordinate the performance of a computing task by a cloud computing provider based on power utility metrics, in accordance with various embodiments.

FIG. 12 shows a flow diagram illustrating an exemplary process 1200 used by a cloud computing resource broker to coordinate the performance of a computing task by a cloud computing provider with the metrics of a power utility, in accordance with various embodiments. It will be appreciated that while process 1200 is described below with respect to cloud computing provider 102(1), the process 1200 may be implemented for any of the cloud computing providers 102(1)-102(n).

At block 1202, the resource broker 110 may receive a computing task request from one of customers 104 for a computing task to be processed by a cloud computing provider, such as the cloud computing provider 102(1). In various embodiments, the computing task may be any task that is suitable for performance using cloud computing. For example, but not as a limitation, the computing task may be the optimization of a database by the cloud computing provider 102(1).

At block 1204, the resource broker 110 may monitor one or more metrics of a power utility that supplies power to the cloud computing provider 102(1). In various embodiments, the metrics may include whether the cost of the power supplied by the power utility is below a certain pre-determined threshold. In other embodiments, the metrics may include whether the power utility is generating a predetermined percentage of its power using "green" energy sources (e.g., wind, solar), and/or whether the power utility is meeting regulatory requirements (e.g., carbon emission and/or pollutions limits).

At decision block 1206, if the resource broker 110 determines that the metrics of the power utility that supplies power to the cloud computing provider 102(1) does not meet threshold requirements ("no" at decision block 1206), the process 1200 may proceed to block 1208.

At block 1208, the resource broker 110 may suspend the processing of the computing task by the cloud computing provider 102(1). In some embodiments, the suspension may be followed by the transfer of the computing task to another cloud computing provider, such as one of the cloud computing providers 102(2)-102(n), whose power utility metrics do meet the threshold requirements. Subsequently, the process 1200 may loop back to process 1206, at which point the metrics of the power utility may be further monitor for compliance with the requirements.

However, if the resource broker 110 determines that the metrics of the power utility does meet the threshold requirements ("yes" at decision block 1206), the process 1200 may proceed to block 1212.

At block 1212, the resource broker 110 may release at least a portion of the computing task for processing by the cloud computing provider 102(1) that is supplied by the power utility.

At decision block 1214, the resource broker 110 may determine whether the computing task is complete. If the resource broker 110 determines that the computing task is completed ("yes" at decision block 1214), the resource broker 110 may provide the result of the computing task to the customer for a gain. The gain may be derived from the difference between the cost charged by the one or more cloud computing providers 102(1)-102(n) and the fee paid by the customer 104 for the computing task.

However, if the resource broker 110 determines that the computing task is incomplete, the process 1200 may loop back to 1206, at which point the metrics of the power utility may be further monitor for compliance with the requirements.

Figure 13:
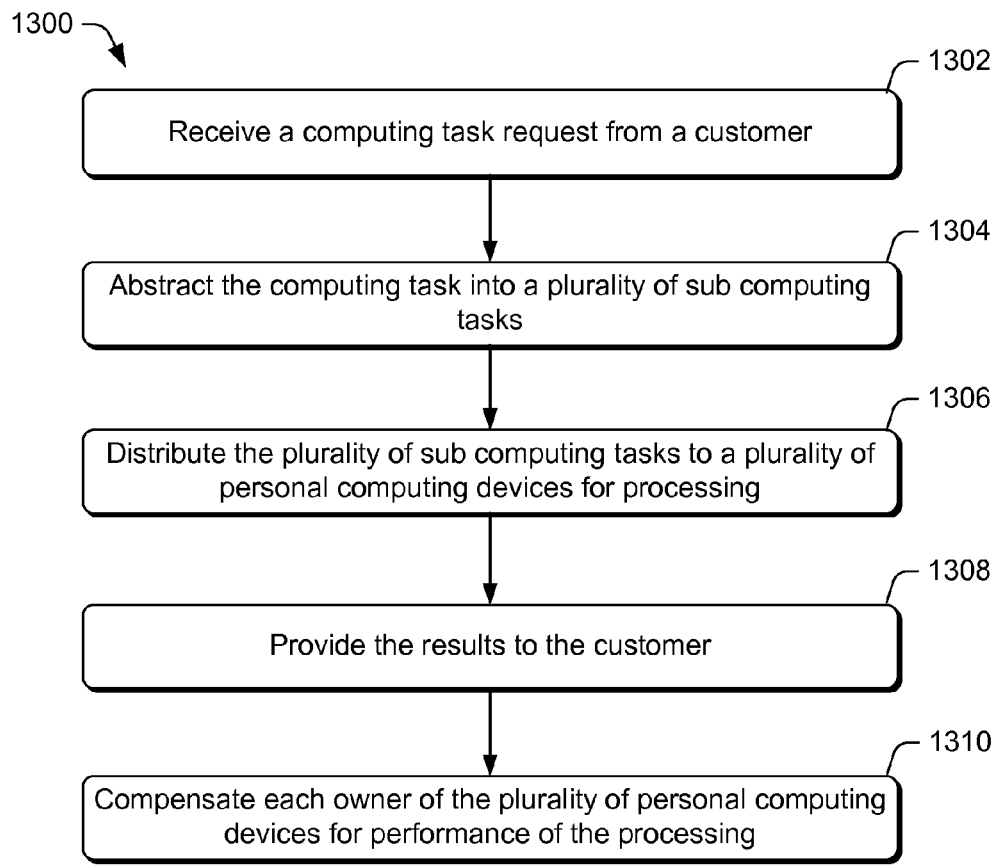
FIG. 13 shows a flow diagram illustrating an exemplary process used by a cloud computing resource broker to distribute at least a portion of a computing task to a plurality of personal computing devices for execution, in accordance with various embodiments.

FIG. 13 shows a flow diagram illustrating an exemplary process 1300 used by a cloud computing resource broker to distribute at least a portion of a computing task to a plurality of personal computing devices for performance, in accordance with various embodiments. It will be appreciated that while process 1300 is described below with respect to cloud computing provider 102(1), the process 1300 may be implemented for any of the cloud computing providers 102(1)-102(n).

At block 1302, the resource broker 110 may receive a computing task request from a customer 104 for a computing task to be processed by a cloud computing provider, such as the cloud computing provider 102(1). In various embodiments, the computing task may be any task that is suitable for performance using cloud computing. For example, but not as a limitation, the computing task may be a web indexing operation.

At block 1304, the resource broker 110 may abstract the computing tasks into a plurality of sub computing tasks. For example, but not as a limitation, the web indexing operation may be divided into smaller web indexing tasks.

At block 1306, the resource broker 110 may distribute the plurality of sub computing tasks to a plurality of personal computer devices. For example, but not as a limitation, the plurality of personal computing devices may include personal computers, portable computers, game consoles, portable phones, and/or the like. Each of the plurality of personal computing devices may have access to a network infrastructure (e.g., Internet) that enables the devices to participate in cloud computing by downloading computing tasks and uploading computation results. In various embodiments, the personal computing devices may be spread over different geographical locations around the globe while remain connected via the network infrastructure 106.

At block 1308, the resource broker 110 may collect the results of the plurality of the process computing tasks. It will be appreciated that the resource broker 110 may collect the results non-sequentially and/or on a continuous basis. In some embodiments, the order of the result collection may depend on the order that the computing tasks are processed by the plurality of computing devices.

At block 1308, the resource broker 110 may provide the results to the customer 104. In some embodiments, the resource broker 110 may provide each of the results as soon as they are computed. In other embodiments, the resource broker 110 may provide first assembled the results into a single package prior to providing them to the customers 104.

At block 1310, the resource broker 110 may compensate each owner of the plurality of personal computing devices for the performance of the processing. For example, but not as a limitation, the resource broker 110 may provide a monetary incentive to each owner. In at least embodiment, the resource broker 110 may also derive a gain that is the difference between value paid by the customer and the financial incentives paid to the owners.

Figure 14:
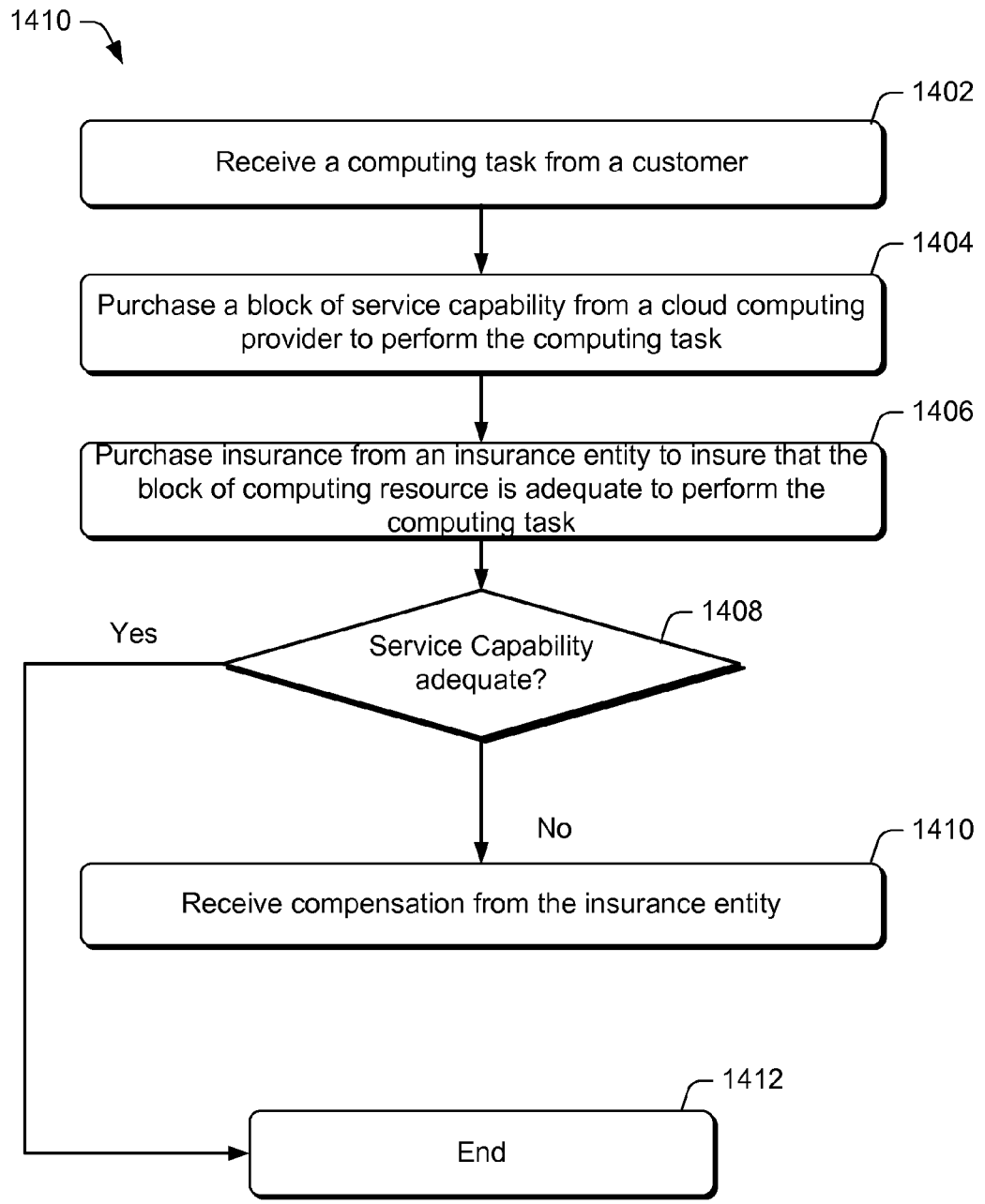
FIG. 14 shows a flow diagram illustrating an exemplary process used by a resource broker to obtain assurance from an insurance entity that a service capability purchased from a cloud computing provider meets performance metrics, in accordance with various embodiments.

FIG. 14 shows a flow diagram illustrating an exemplary process 1400 used by a resource broker to obtain assurance from an insurance entity that service capability purchased from a cloud computing provider meets performance metrics, in accordance with various embodiments. It will be appreciated that while process 1400 is described below with respect to cloud computing provider 102(1), the process 1400 may be implemented for any of the cloud computing providers 102(1)-102(n).

At block 1402, the resource broker 110 may receive a computing task request from a customer 104 for a computing task to be processed by a cloud computing provider, such as the cloud computing provider 102(1). In various embodiments, the computing task may be any task that is suitable for performance using cloud computing. For example, but not as a limitation, the computing task may be a web indexing operation.

At block 1404, the resource broker 1406 may purchase a block of service capability from a cloud computing provider 102(1). The resource broker 110 may make the purchase via an electronic sales transaction. In various embodiments, the block of service capability may meet certain performance attributes so that it is adequate for the performance of the computing task. For example, but not as a limitation, the block of service capability may have a response latency that is shorter than a predetermined length of time.

At block 1406, the resource broker 110 may purchase insurance from an insurance entity to insure that the computing resource is adequate to perform the computing task. For example, but not as a limitation, the insurance may insure that that the response latency of the service capability is shorter than a predetermined length of time for the duration of the computing task. The resource broker 110 may make the purchase via an electronic sales transaction.

In various embodiments, the insurance entity may independently evaluate the adequacy of the service capability of the cloud computing provider 102(1) for the performance of the computing task prior to providing the insurance to the resource broker 110.

At decision block 1408, the resource broker 110 may determine whether the service capability was adequate for the performance of the computing task. In various embodiments, the resource broker 110 may make the determination during or following the substantial performance of the computing task. If the resource broker 110 determines that it should receive compensation due to inadequate performance by the cloud computing provider 102(1) ("no" at decision block 1408), the process 1400 may proceed to block 1410.

At block 1410, the resource broker 110 may receive compensation (e.g., financial recoupment) from the insurance entity. In various embodiments, the insurance entity may request verification from the resource broker 110 of the inadequacy, or independently evaluate the adequacy of the service capability, prior to providing the resource broker 110 with the compensation.

However, if the resource broker 110 determines that the service capability of the cloud computing provider 102(1) is performing adequately or performed adequately for the computing task ("yes" at decision block 1410), the process 1400 may terminate at block 1412.

Figure 15:
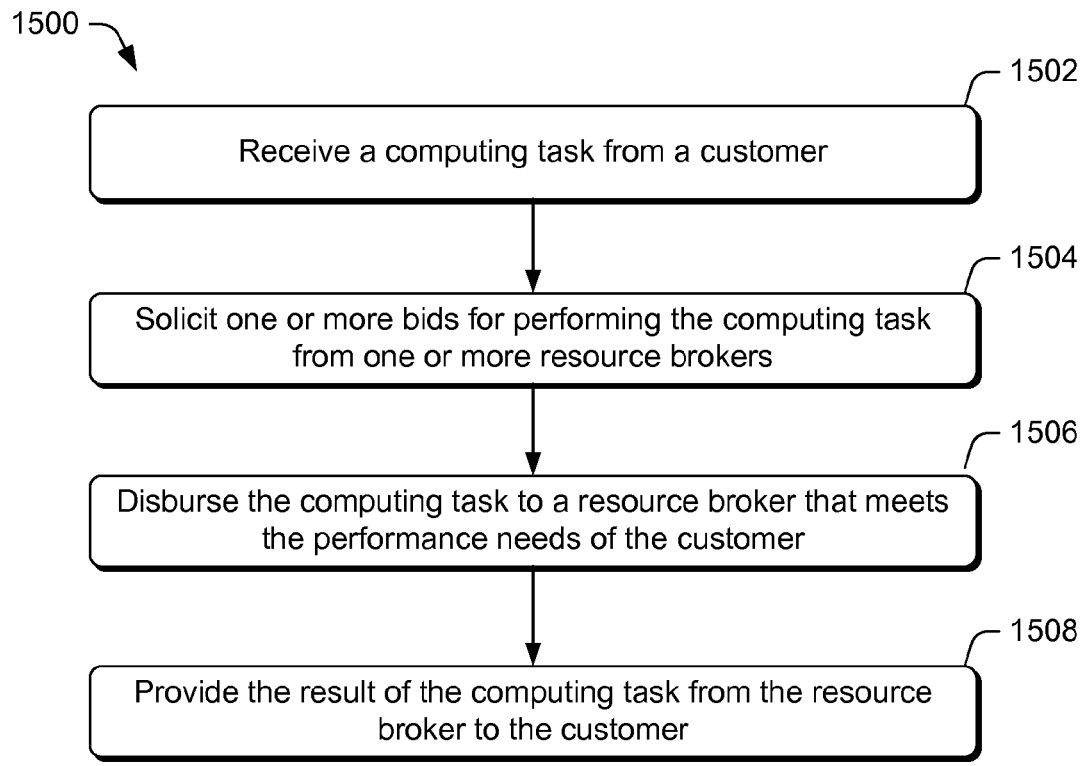
FIG. 15 shows a flow diagram illustrating an exemplary process used by an agent to disburse computing tasks for execution by one or more resource brokers in coordination with cloud computing providers, in accordance with various embodiments.

FIG. 15 shows a flow diagram illustrating an exemplary process 1500 used by an agent to disburse computing tasks for performance by one or more resource brokers that coordinates with cloud computing providers, in accordance with various embodiments.

At block 1502, a resource agent 114 may receive a computing task from a customer 104. In various embodiments, the computing task may be any task that is suitable for performance using cloud computing. For example, but not as a limitation, the computing task may be a web indexing operation. The resource agent 114 may act as an intermediary between the customer and one or more resource brokers. In at least one embodiment, the resource agent 114 may act on the behalf of the customer to negotiate with the one or more resource brokers 110.

At block 1504, the resource agent 114 may solicit one or more bids for performing the computing task from one or more resource brokers 110. For example, but not as a limitation, the resource broker 110 may solicit the bids via electronic bidding, such as via an electronic auction website. In various embodiments, the bids may be for the lowest cost for the performance of the computing, the shortest response latency, the shortest computing task completion time, and/or other characteristics desired by the customer. In some embodiments, the bids may be solicited via an auction. For example, but not as a limitation, the auction may be an English auction, a Dutch auction, or a Vickery auction. In at least one embodiment, the auction may be conducted in real time following the receipt of the computing task by the resource agent 114. Moreover, the resource agent 114 may solicit the bids via electronic bidding, such as via an electronic auction website.

At block 1506, the resource agent 114 may disburse the computing task to a resource broker with the most advantageous bid to for the customer. For example, but not as a limitation, the resource agent 114 may disburse the computing task to a resource broker 110 with the lowest bid while meeting the performance needs of the customer. It will be appreciated that each of the resource brokers may further contract with one or more cloud computing providers 102, as described with regard to FIGS. 2-14, to obtain the necessary service capability to meet the performance needs of the customer.

At block 1508, the resource agent 114 may collect the result obtained from the performance of the computing task and provide the result to the customer. The resource agent 114 may also transfer compensation (e.g., financial incentive) from the customer to the resource broker for the performance of the computing task.

Exemplary Cloud Computing Resource Application

Figure 16:
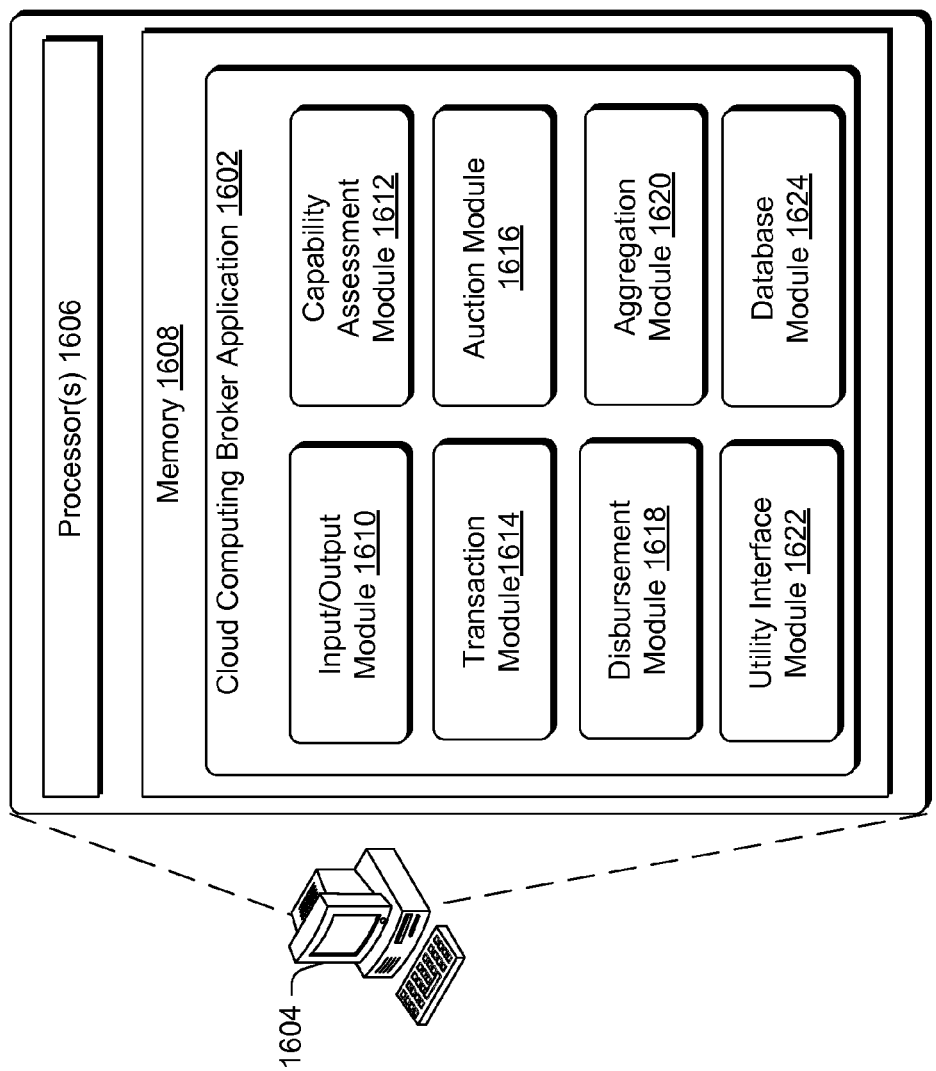
FIG. 16 shows a block diagram that illustrates selected components of an exemplary cloud computing resource application used by a computing resource broker, in accordance with various embodiments.

FIG. 16 shows a block diagram that illustrates selected components of an exemplary cloud computing broker application 1602, as used by a computing resource broker, in accordance with various embodiments. The cloud computing resource application 1602 may be implemented on a computing device 1604 that includes one or more processors 1606 and memory 1608.

The memory 1608 may include volatile and/or nonvolatile memory, removable and/or non-removable media implemented in any method or technology for storage of information, such as computer-readable instructions, data structures, program modules or other data. Such memory may include, but is not limited to, random accessory memory (RAM), read-only memory (ROM), electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and is accessible by a computer system.

The memory 1608 may store program instructions. The program instructions, or modules, may include routines, programs, objects, components, and data structures that cause components of computer 102 to perform particular tasks or implement particular abstract data types. The selected program instructions may include an input/output module 1610, a capability assessment module 1612, a transaction module 1614, an auction module 1616, a disbursement module 1618, an aggregation module 1620, a utility interface module 1622, and a database module 1624.

The input/output module 1610 may be used to communicate with the computing resource providers 102(1)-102(n), as well as the resource agent 114. In various embodiments, the input/output module 1610 may receive attribute data from the cloud computing providers 102(1)-102(n). Additionally, the input/output module 1610 may be used to receive electronic payments and computing tasks from and provide results to the customers 104, as well as facilitate sales transactions with the cloud computing providers 102(1)-102(n), such as the purchase of service capabilities. Further, the input/output module 1610 may receive computing tasks from and provide results to the resource agent 114.

The capability assessment module 1612 may include custom analytics for the assessment of the service capabilities of cloud computing providers 102(1)-102(n). In various embodiments, the custom analytics may include machine learning tools that collect data and predict outcomes using predictive models. The custom analytics may provide independently-derived attribute data regarding response latency, amount of bandwidth, amount of memory, amount of storage capacity, cost of obtaining the solution, security strength, and/or the like for service capabilities. Moreover, the capability assessment module 1610 may further compare the independently-derived attribute data with the attribute data obtained from the cloud computing providers 102(1)-102(n) to determine discrepancies in the data.

The transaction module 1614 may be employed to carry out monetary transactions with the cloud computing providers 102(1)-102(n), as well as the resource agent 114. The monetary transactions may include the purchase of service capabilities from the cloud computing providers 102(1)-102(n) (e.g., receiving electronic reservations or promises of service capabilities in exchange for monetary compensation).

In various embodiments, the transaction module 1614 may account for the costs of profits of various transactions, including computing the gains derived from compensation received from customers 104 and resource agents 116, in combination with payments made to cloud computing providers 102(1) to 102(n). The transaction module 1614 may collect payment and disburse compensation related to the use of service capability for the performance of computing tasks.

The auction module 1616 may provide the ability to solicit bids for the performance of computing tasks. In various embodiments, the auction module 1616 may provide an electronic bidding system that enables cloud computing providers 102(1)-102(n) to submit bids for the performance of computing tasks or portions of computing tasks. The auction module 1616 may also automatically identify one or more lowest bids.

The disbursement module 1618 may include algorithms for dividing blocks of service capabilities and computing tasks. The disbursement module 1618 may include algorithms for dividing blocks of service capabilities into portions according to time, processing bandwidth, memory allocation, data storage allocation, and/or the like. The disbursement module 1618 may further include algorithms for abstracting computing tasks into sub computing tasks. The disbursement module 1618 may further disburse the service capabilities and computing tasks to customer and cloud computing providers. In some embodiments, the disbursement module 1618 may disburse computing tasks and sub computing tasks to one of the cloud computing providers 102(1)-102(n) that provides the lowest bid.

The aggregation module 1620 may integrate service capabilities and/or portions of service capabilities into packages. In various embodiments, the aggregation module 1620 may include an algorithm that determines service capabilities that are favored by the one or more customers 104, or frequently desired in combination by the one or more customers 104, for aggregation. The aggregation module 1620 may aggregate the service capabilities by associating, or electronically tagging them together for sale.

The utility interface module 1622 may interface with various power utilities to determine their metrics. In various embodiments, the metrics may include whether the cost of the power supplied by the power utility is below a certain predetermined threshold. In other embodiments, the metrics may include whether the power utility is generating a predetermined percentage of its power using "green" energy sources (e.g., wind, solar), and/or whether the power utility is meeting regulatory requirements (e.g., carbon emission and/or pollutions limits).

The database module 1624 may be configured to store data in a portion of memory 1608 (e.g., a database) for retrieval. The data storage module 1620 may be configured to store the customs analytics and attribute data of the cloud computing providers 102(1)-102(n). Additionally, the data storage module 1620 may further store the results of computing tasks for retrieval and provision to one or more customers 114. The data storage module 1620 may further store performance histories of the cloud computing providers 102(1)-102(n).

Exemplary Cloud Computing Agent Application

Figure 17:
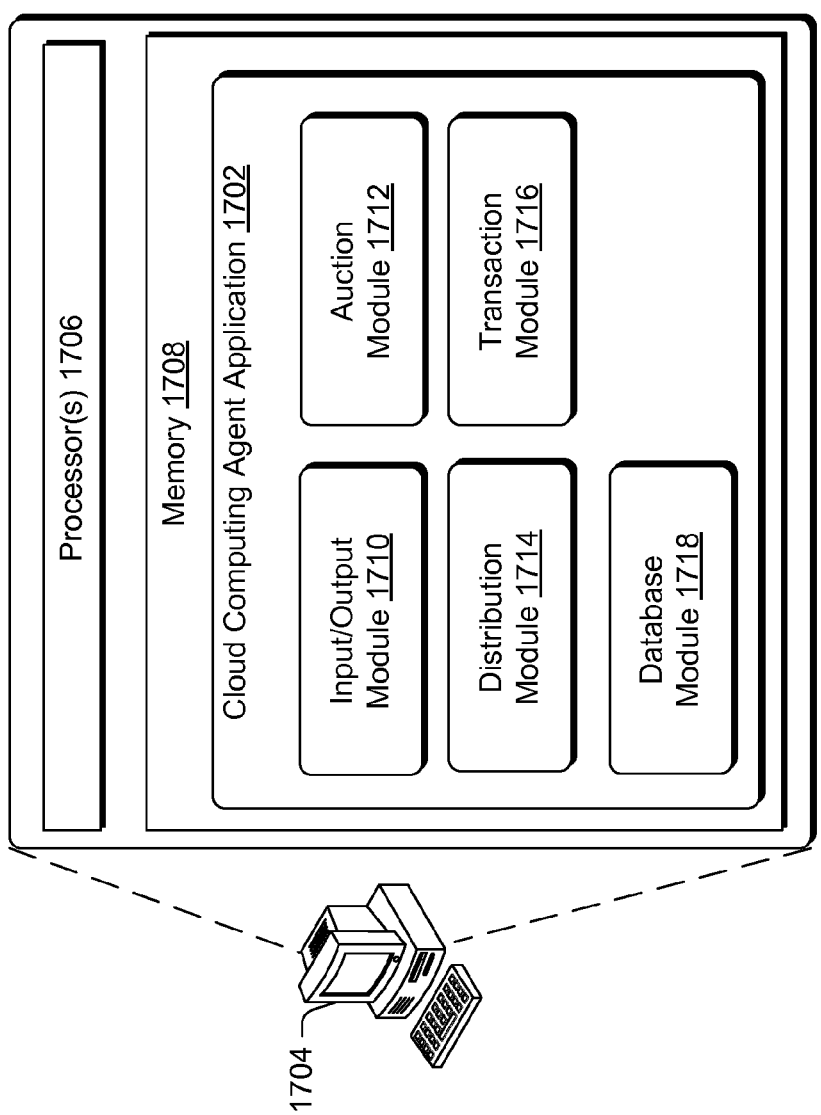
FIG. 17 shows a block diagram that illustrates selected components of an exemplary cloud computing agent application used by a resource agent, in accordance with various embodiments.

FIG. 17 shows a block diagram that illustrates selected components of an exemplary cloud computing agent application 1702, as used by a resource agent, in accordance with various embodiments. The cloud computing agent application 1702 may be implemented on a computing device 1704 that includes one or more processors 1706 and memory 1708.

The memory 1708 may include volatile and/or nonvolatile memory, removable and/or non-removable media implemented in any method or technology for storage of information, such as computer-readable instructions, data structures, program modules or other data. Such memory may include, but is not limited to, random accessory memory (RAM), read-only memory (ROM), electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and is accessible by a computer system.

The memory 1708 may store program instructions. The program instructions, or modules, may include routines, programs, objects, components, and data structures that cause components of computing device 1704 to perform particular tasks or implement particular abstract data types. The selected program instructions may include an input/output module 1710, an auction module 1712, a distribution module 1714, a transaction module 1716, and a database module 1718.

The input/output module 1710 may be used to communicate with the resource broker 110. In various embodiments, the input/output module 1710 may be used to receive electronic payments from and provide results to the customers 104, as well as disburse computing tasks to cloud computing resource brokers, such as the computing resource broker 110.

The auction module 1712 may provide the ability to solicit bids for the performance of computing tasks. In various embodiments, the auction module 1712 may provide an electronic bid system that enables one or more resource brokers 110 to submit bids for the performance of computing tasks or portions of computing tasks. The auction module 1712 may also automatically identify one or more lowest bids.

The distribution module 1714 may be employed to disburse computing tasks to one or more resource brokers 110. In some embodiments, the distribution module 1714 may disburse computing tasks to resource brokers 110 that provide one or more lowest bids.

The transaction module 1716 may be employed to carry out monetary transactions with the resource brokers 110. The transaction module 1716 may account for the costs of profits of various transactions, including computing the gains derived from compensation received from customers 104 and payments made to resource brokers 110.

The database module 1718 may be configured to store data in a portion of memory 1708 (e.g., a database) for retrieval. The data storage module 1620 may store data on the resource brokers 110 (e.g., payment history, performance history, etc.).

Exemplary Computing Device

Figure 18:
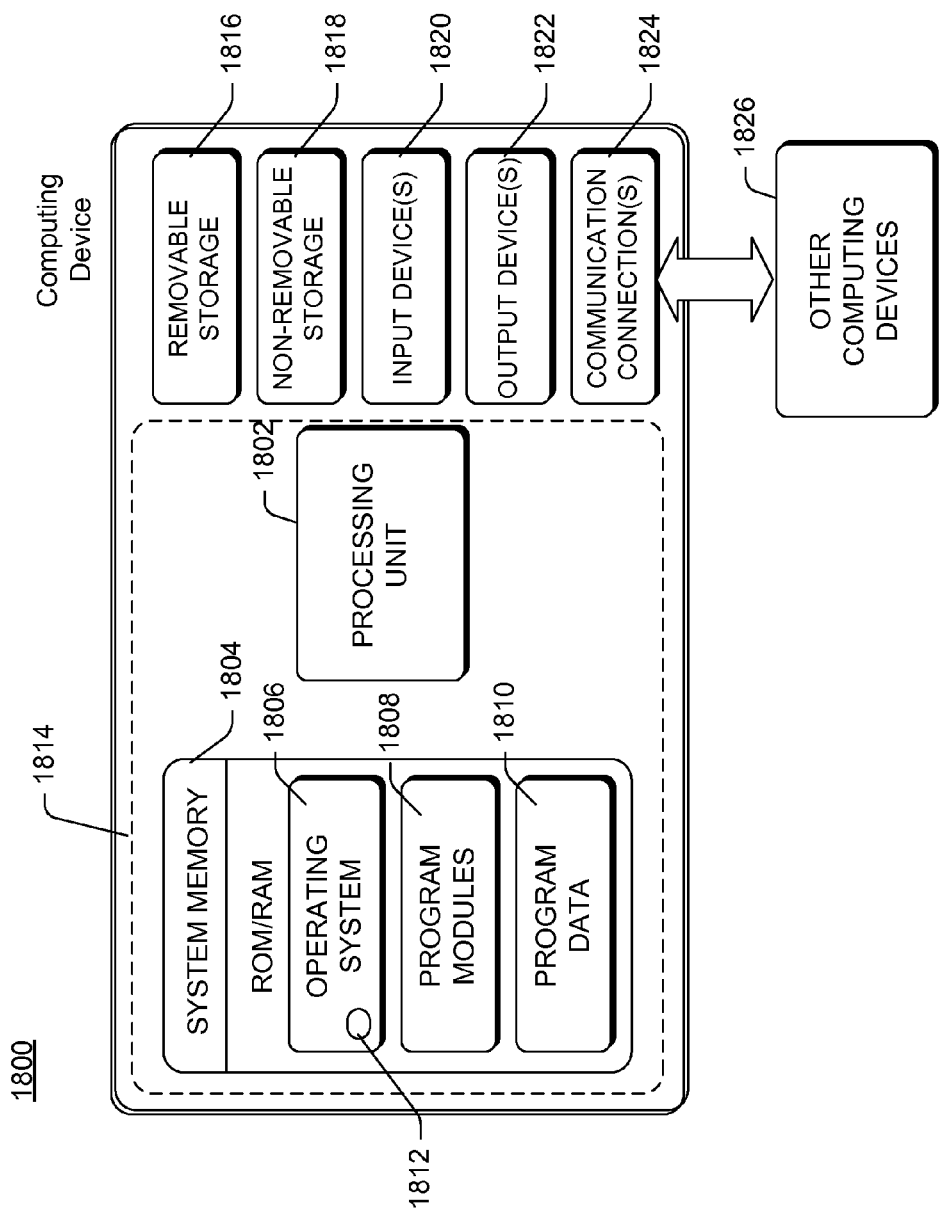
FIG. 18 illustrates a representative computing device that is implemented for cloud computing, in accordance with various embodiments.

FIG. 18 illustrates a representative computing device 1800 that may be implemented for cloud computing. In some embodiments, the computing device 1800 may be implemented as part of a data center, or as a personal computing device, as described in FIG. 1.

In other embodiments, the representative computing device 1800 may be used by a computing resource broker, such as the resource broker 110, to implement the cloud computing broker application 1802 and/or the cloud computing agent application 1702. For example, but not as a limitation, the computing device 1800 may execute computer-executable instructions that implement custom analytics for the analysis of service capabilities of cloud computing providers. The representative computing device 1800 may also be used by the cloud computing providers, such as the cloud computing provider 102(1), and the computing resource broker, such as the resource broker 110, to execute computer-executable instructions for soliciting auction bids, carrying out electronic sales and payment transactions, and/or dividing computing tasks into sub tasks.

However, it will be readily appreciated that the techniques and mechanisms may be implemented in other computing devices, systems, and environments. The computing device 1800 shown in FIG. 18 is only one example of a computing device and is not intended to suggest any limitation as to the scope of use or functionality of the computer and network architectures. Neither should the computing device 1800 be interpreted as having any dependency or requirement relating to any one or combination of components illustrated in the example computing device.

In at least one configuration, computing device 1800 may include at least one processing unit 1802 and system memory 1804. Depending on the exact configuration and type of computing device, system memory 1804 may be volatile (such as RAM), non-volatile (such as ROM, flash memory, etc.) or some combination of the two. System memory 1804 may include an operating system 1806, one or more program modules 1808, and program data 1810. The operating system 1806 may include a component-based framework 1812 that supports components (including properties and events), objects, inheritance, polymorphism, reflection, and provides an object-oriented component-based application programming interface (API), such as, but by no means limited to, that of the .NET™ Framework manufactured by the Microsoft Corporation, Redmond, Wash. The computing device 1800 is of a very basic configuration demarcated by a dashed line 1814. Again, a terminal may have fewer components but will interact with a computing device that may have such a basic configuration.

Computing device 1800 may have additional features or functionality. For example, computing device 1800 may also include additional data storage devices (removable and/or non-removable) such as, for example, magnetic disks, optical disks, or tape. Such additional storage is illustrated in FIG. 18 by removable storage 1816 and non-removable storage 1818. Computer storage media may include volatile and nonvolatile, removable and non-removable media implemented in any method or technology for storage of information, such as computer readable instructions, data structures, program modules, or other data. System memory 1804, removable storage 1816 and non-removable storage 1818 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by Computing device 1800. Any such computer storage media may be part of device 1800. Computing device 1800 may also have input device(s) 1820 such as keyboard, mouse, pen, voice input device, touch input device, etc. Output device(s) 1822 such as a display, speakers, printer, etc. may also be included. These devices are well known in the art and are not discussed at length here.

Computing device 1800 may also contain communication connections 1824 that allow the device to communicate with other computing devices 1826, such as over a network. These networks may include wired networks as well as wireless networks. Communication connections 1824 are some examples of communication media. Communication media may typically be embodied by computer readable instructions, data structures, program modules, etc.

It is appreciated that the illustrated computing device 1800 is only one example of a suitable device and is not intended to suggest any limitation as to the scope of use or functionality of the various embodiments described. Other well-known computing devices, systems, environments and/or configurations that may be suitable for use with the embodiments include, but are not limited to personal computers, server computers, hand-held or laptop devices, multiprocessor systems, microprocessor-base systems, set top boxes, game consoles, programmable consumer electronics, network PCs, minicomputers, mainframe computers, distributed computing environments that include any of the above systems or devices, and/or the like.

As cloud computing data center proliferate due to increased reliance by customers, and with the commoditization of cloud computing service capabilities, customers desiring to use cloud computing services have an ever expanding array of choices in cloud computing providers and associated data centers. Thus, cloud computing resource brokers may provide vital services may assist customer in selecting, negotiating, and contracting with the cloud computing providers. In this way, customers desiring cloud computing services may be assured that they obtain reliable service capability that also meet their financial needs as well as other concerns.

CONCLUSION

In closing, although the various embodiments have been described in language specific to structural features and/or methodological acts, it is to be understood that the subject matter defined in the appended representations is not necessarily limited to the specific features or acts described. Rather, the specific features and acts are disclosed as exemplary forms of implementing the claimed subject matter.

The invention claimed is:

1. A computer readable medium storing computer-executable instructions that, when executed, cause one or more processors to perform acts comprising:
   soliciting bids from a plurality of cloud computing providers for providing a block of cloud computing service capability;
   purchasing the block of cloud computing service capability from a cloud computing provider selected from the plurality of cloud computing providers in response to determining that the cloud computing provider charges a lowest cost for the block of cloud computing service capability;
   selling at least the block of cloud computing service capability to one or more customers for a monetary gain, the block of cloud computing service capability enabling a computing task to be processed via cloud computing;
   receiving monetary payment from a customer for providing a commitment that the block of clouding computing service capability meets performance metrics of the customer for a time period;
   obtaining first performance attribute data on a performance of the block of cloud computing service capability from the cloud computing provider during the time period; and
   providing compensation to the customer when the performance of the block of cloud computing capability fails to meet the performance metrics;
   analyzing the block of cloud computing service capability using independent analytics to generate second performance attribute data for the block of cloud computing service capability; and
   providing the independent analytics to the cloud computing provider in exchange for monetary payment when the second performance attribute data indicates that the performance of the block of cloud computing service capability is superior than indicated by the first performance attribute data.

2. The computer readable medium of claim 1, further comprising an instruction that when executed, cause one or more processors to perform an act of dividing the block of the cloud computing service capability into a plurality of portions, wherein the selling at least the block includes selling the plurality of portions to one or more customers for gain.

3. The computer readable medium of claim 1, further comprising instructions that when executed, cause one or more processors to perform further acts comprising
   providing an incentive to the cloud computing provider when the actual performance of the block of cloud computing service capability meets or exceeds the performance metrics; and
   receiving a compensation from the cloud computing provider when the actual performance of the block of cloud computing service capability falls below the performance metrics.

4. The computer readable medium of claim 3, wherein the incentive is a purchase of an additional block of cloud computing service capability from the cloud computing provider.

5. The computer readable medium of claim 1, further comprising instructions that when executed, cause one or more processors to perform further acts comprising:
   purchasing an additional block of cloud computing service capability from another cloud computing provider; and aggregating the block of cloud computing service capability and the additional block of cloud computing service capability into a package,
wherein the selling includes selling the package to one or more customers for the monetary gain.

6. The computer readable of claim 1, further comprising instructions that when executed, cause one or more processors to perform further acts comprising:
purchasing an additional block of cloud computing service capability from another cloud computing provider;
dividing the additional block of cloud computing service capability into a plurality of additional portions; and
aggregating the block of cloud computing service capability and one of the plurality of additional portions of cloud computing service capability into a package,
wherein the selling includes selling the package to one or more customers for the monetary gain.

7. A computer-implemented method for a computing resource broker that is an intermediary between customers and cloud computing providers to facilitate performance of computing tasks, comprising:
under control of one or more servers comprising one or more processors,
receiving a request for a computing task to be performed from a customer;
selecting a cloud computing provider from the cloud computing providers on behalf of the customer to perform the computing task; and
obtaining a monetary gain from performance of the computing task by the cloud computing provider, the monetary gain being a difference between a value paid by the customer to the computing resource broker for having the computing task performed and a compensation paid by the computing resource broker to the cloud computing provider for performance of the computing task.

8. The computer-implemented method of claim 7, further comprising providing a result obtained from the performance of the computing task to the customer.

9. The computer-implemented method of claim 7, further comprising soliciting bids for the performance of the computing task from the cloud computing providers, wherein the selecting includes selecting the cloud computing provider based on the cloud computing provider submitting a most economical bid for the customer.

10. The computer-implemented method of claim 7, further comprising soliciting bids for the performance of the computing task from the cloud computing providers, wherein the selecting includes selecting the cloud computing provider based on prior performance capability or prior performance cost of the cloud computing provider when no bids are received for the performance of the computing task.

11. The computer-implemented method of claim 7, further comprising:
Storing a result of the computing task performed by the cloud computing provider in a database controlled by the computing resource broker; and
providing the result from the database to an additional customer in response to receiving an additional request for the computing task from the additional customer.

12. The computer-implemented method of claim 11, further comprising receiving a monetary payment from the additional customer for the result.

13. The computer-implemented method of claim 7, wherein the computing task is a first portion of an overall computing task requested by the customer, further comprising selecting an additional cloud computing provider to perform a second portion of the overall computing task on behalf of the customer.

14. The computer-implemented method of claim 7, wherein the cloud computing provider uses personal computing devices of multiple users to perform at least a portion of the computing task.

15. The computer-implemented method of claim 7, further comprising:
monitoring a metric of a power utility that supplies power to the cloud computing provider;
releasing at least a portion of the computing task for processing by the cloud computing provider when the metric meets a requirement; and
suspending the processing of the computing task when the metric fails to meet the requirement,
the requirement including that a cost of power from the power utility is below a threshold, a minimum percentage of power from the power utility is from a green source, or the power utility complies with regulation.

16. The computer-implemented method of claim 7, further comprising:
purchasing insurance from an insurance entity to insure that the cloud computing provider is able to adequately perform the computing task; and
receiving compensation from the insurance entity when the cloud computing entity is unable to adequately perform the computing task.

17. A computer readable medium storing computer-executable instructions that, when executed, cause one or more processors to perform acts comprising:
receiving a request from a customer for a computing task to be performed by a cloud computing provider;
soliciting one or more bids for performing the computing task from one or more computing resource brokers that contract with one or more cloud computing providers having computing resources to perform computing tasks;
disbursing the computing task to a computing resource broker with a lowest bid for performance of the computing task, the performance of the computing task to be accomplished by a contracted cloud computing provider that is selected by the computing resource broker; and
providing a results from the performance of the computing task as received from the computing resource broker to the customer, wherein the computing resource broker obtains a monetary gain from the performance of the computing task by the contracted cloud computing provider that is a difference between a value paid by the customer to the computing resource broker for having the computing task performed and a compensation paid by the computing resource broker to the contracted cloud computing provider for performance of the computing task.

* * * * *